US012762669B2

(12) United States Patent
Takada

(10) Patent No.: US 12,762,669 B2
(45) Date of Patent: Oct. 13, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/081,033

(22) Filed: Mar. 17, 2025

(65) Prior Publication Data

US 2025/0308000 A1 Oct. 2, 2025

(30) Foreign Application Priority Data

Mar. 26, 2024 (JP) ................................ 2024-049992

(51) Int. Cl.

| | |
|---|---|
| ***G06T 5/70*** | (2024.01) |
| ***G06V 10/60*** | (2022.01) |
| ***G06V 10/75*** | (2022.01) |
| ***H04N 25/773*** | (2023.01) |

(52) U.S. Cl.

CPC ................ *G06T 5/70* (2024.01); *G06V 10/60* (2022.01); *G06V 10/751* (2022.01); *H04N 25/773* (2023.01); *G06T 2207/20182* (2013.01)

(58) Field of Classification Search

CPC ............. G06T 5/70; G06T 2207/20182; G06T 2207/20081; G06T 2207/20084; G06T 5/60; G06V 10/60; G06V 10/751; H04N 25/773

See application file for complete search history.

(56) References Cited

U.S. PATENT DOCUMENTS

| | | | | |
|---|---|---|---|---|
| 2005/0147293 A1* | 7/2005 | Lee | H04N 5/21 | 348/E5.077 |
| 2011/0063637 A1* | 3/2011 | Kondo | G06K 15/102 | 358/1.9 |
| 2012/0182323 A1* | 7/2012 | Omi | G06T 7/0002 | 345/660 |
| 2014/0072214 A1* | 3/2014 | Tanaka | H04N 25/135 | 382/165 |

(Continued)

FOREIGN PATENT DOCUMENTS

| | | |
|---|---|---|
| JP | 2010-092461 A | 4/2010 |
| JP | 2010-171808 A | 8/2010 |
| JP | 2023-170078 A | 12/2023 |

*Primary Examiner* — Kyu Chae

(74) *Attorney, Agent, or Firm* — Venable LLP

(57) ABSTRACT

An information processing apparatus including a determination unit configured to acquire an image including a target pixel as a pixel of a local positive peak signal and captured by a photon-counting image sensor, an interpolation unit configured to interpolate an interpolation signal to a peripheral pixel as a pixel around the target pixel of the image, and a reduction unit configured to reduce noise of the image in which the interpolation signal has been interpolated. The local positive peak signal spreads over a plurality of pixels, and an image, in which a signal of the peripheral pixel is a signal of a black level not higher than a predetermined level threshold, is acquired.

19 Claims, 13 Drawing Sheets

(56) References Cited

U.S. PATENT DOCUMENTS

| | | | | |
|---|---|---|---|---|
| 2015/0373275 | A1* | 12/2015 | Kitada | H04N 5/20 348/234 |
| 2021/0321963 | A1* | 10/2021 | Manor | G06T 11/00 |
| 2025/0069196 | A1 | 2/2025 | Takada | |
| 2025/0173829 | A1* | 5/2025 | Hanwell | G06T 3/4007 |

* cited by examiner

LOW GAIN IMAGE CAPTURING
※ UNDER HIGH ILLUMINANCE

HIGH GAIN IMAGE CAPTURING
※ UNDER LOW ILLUMINANCE

INFERENCE

LEARNING

INFORMATION PROCESSING APPARATUS, INFORMATION PROCESSING METHOD, AND NON-TRANSITORY COMPUTER-READABLE STORAGE MEDIUM

CROSS-REFERENCE TO PRIORITY APPLICATION

This application claims the benefit of Japanese Patent Application No. 2024-049992, filed Mar. 26, 2024, which is hereby incorporated by reference herein in its entirety.

BACKGROUND OF THE INVENTION

Field of the Invention

The present disclosure relates to an information processing apparatus, an information processing method, and a non-transitory computer-readable storage medium.

Description of the Related Art

In recent years, a Single Photon Avalanche Diode (SPAD) sensor as a kind of an image sensor has been developed and mounted on a camera.

Although CMOS sensors are well-known as camera sensors, in CMOS sensors, noises that degrades image quality is also present when light is read out as an electrical signal. On the other hand, SPAD sensors generate no readout noise but generate shot noise or dark current noise. Thus, when a signal is amplified, noise is also amplified, and the amount of noise is conspicuous such that image capturing is performed with high sensitivity (gain).

As a method of reducing noise, for example, there is disclosed a technique of smoothing the signal level of a local region after removing impulse noise, as described in Japanese Patent Laid-Open No. 2010-092461. Furthermore, as described in Japanese Patent Laid-Open No. 2010-171808, there is disclosed a technique of calculating a moving amount between frames and performing noise reduction processing in the time direction based on the moving amount after performing noise reduction processing in the spatial direction for each frame.

In addition, as a noise reduction method of a scanning electron microscope using machine learning, there is disclosed a technique of applying artificial noise to a supervisory image and stretching noise in a specific direction by applying an anisotropic filter in a scan direction, as described in Japanese Patent Laid-Open No. 2023-170078.

SUMMARY OF THE INVENTION

According to one aspect of the present disclosure, an information processing apparatus comprises a determination unit configured to acquire an image including a target pixel as a pixel of a local positive peak signal and captured by a photon-counting image sensor, an interpolation unit configured to interpolate an interpolation signal to a peripheral pixel as a pixel around the target pixel of the image, and a reduction unit configured to reduce noise of the image in which the interpolation signal has been interpolated.

According to another aspect of the present disclosure, an information processing method comprises acquiring an image including a target pixel as a pixel of a local positive peak signal and captured by a photon-counting image sensor, interpolating an interpolation signal to a peripheral pixel as a pixel around the target pixel of the image, and reducing noise of the image in which the interpolation signal has been interpolated.

According to another aspect of the present disclosure, a non-transitory computer-readable storage medium storing a computer program for causing, when loaded and executed by a computer, the computer to acquire an image including a target pixel as a pixel of a local positive peak signal and captured by a photon-counting image sensor to interpolate an interpolation signal to a peripheral pixel as a pixel around the target pixel of the image, and to reduce noise of the image in which the interpolation signal has been interpolated.

Further features of the present invention will become apparent from the following description of exemplary embodiments (with reference to the attached drawings).

DESCRIPTION OF THE EMBODIMENTS

Figure 1:
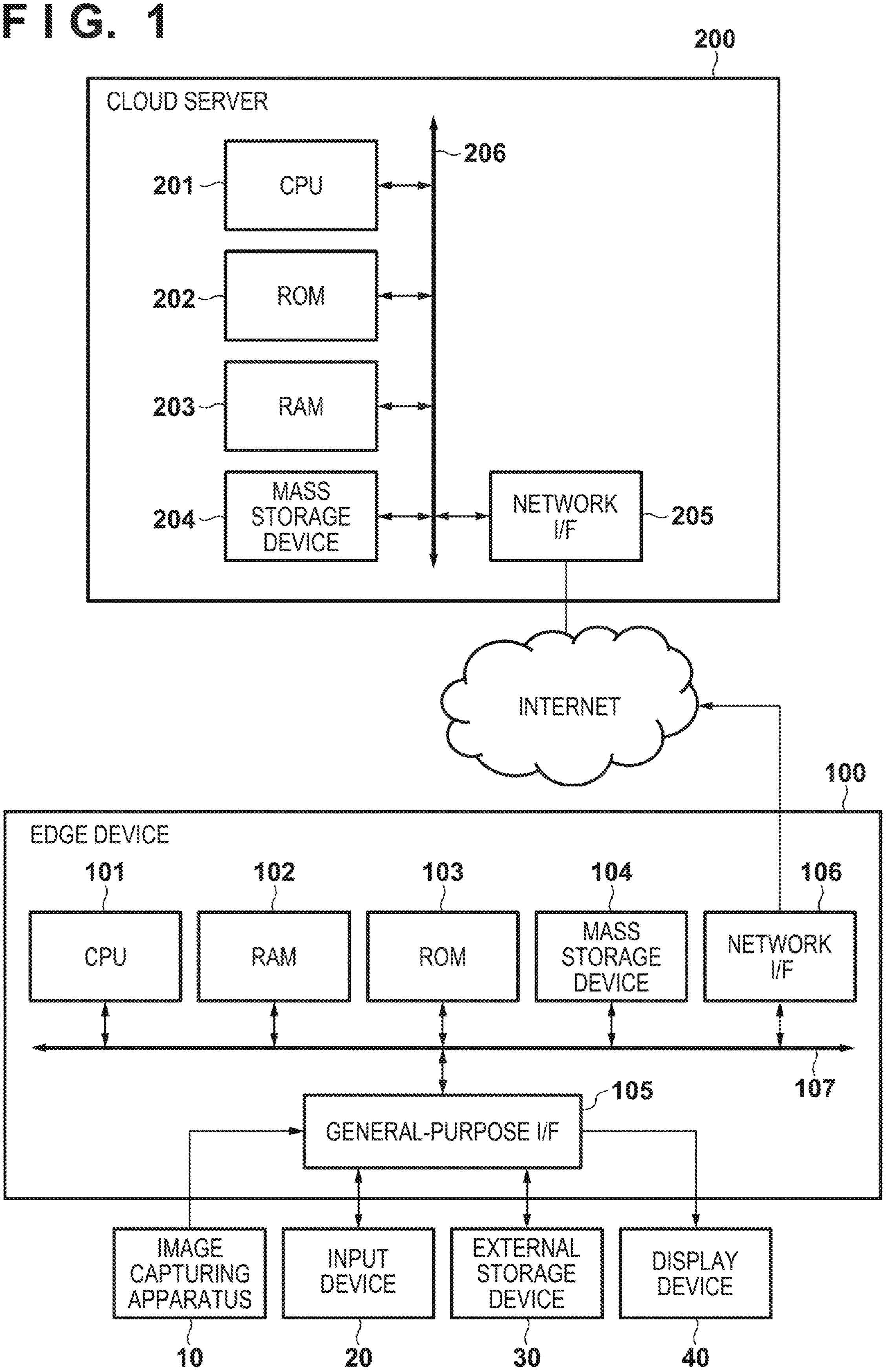
FIG. 1 is a block diagram showing an example of the hardware configuration of an information processing system according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

The difference between the CMOS sensor and the SPAD sensor is clearly visible at the time of image capturing with a high gain. If image capturing is performed with a high gain using a camera with the SPAD sensor in a low-illuminance environment, an image including sparsely distributed pixels in each of which photons can be counted and positive peak signals sparsely distributed due to avalanche multiplication is obtained. The local positive peak signals are signals that can be acquired in a case when there exist pixels in each of which a few photons can barely be counted, and are effective as object information. The signals are specific to an image capturing apparatus including a photon-counting image sensor such as the SPAD sensor.

However, if noise reduction processing described in each of Japanese Patent Laid-Open Nos. 2010-092461 and 2010-171808 is performed for such image, the positive peak signals are determined as singular points, that is, noise, and effective signals that should originally be preserved readily decrease, that is, disappear.

Furthermore, as described in Japanese Patent Laid-Open No. 2023-170078, even if, after noise specific to an image capturing apparatus is applied to a supervisory image, the supervisory image and a student image generated by performing processing using an anisotropic filter are paired to perform learning to make the student image closer to the supervisory image using machine learning, signals unwantedly disappear.

This is because two tasks including a task of whether to remove signals (=noise reduction processing) and a task of whether to newly generate a signal and interpolate it at a position where there is no signal are contradictory, and it is difficult to derive an optimal solution. If directivity is given to signals by an anisotropic filter, the signals may remain after noise reduction, thereby obtaining an unnatural processing result.

To cope with this, in this embodiment, deterioration restoration is performed while reducing disappearance of the positive peak signals in the image.

<CNN>

A convolutional neural network (CNN) used in general information processing techniques using deep learning, which is used in the following embodiments, will be described first. The CNN is a technique of repetitively convoluting a filter generated by training or learning in image data and then performing a nonlinear operation. The filter is also called a local receptive field. Image data obtained by convoluting a filter in image data and then performing a nonlinear operation is called a feature map. Furthermore, learning is performed using learning data (training images or data sets) formed by a pair of input image data and output image data. Simply, learning is generating the value of a filter capable of accurately converting input image data into corresponding output image data from learning data. Details will be described later.

If image data has RGB color channels, or a feature map is formed by a plurality of image data, the filter used for convolution has a plurality of channels in accordance with this. That is, the convolution filter is expressed by a four-dimensional array including not only vertical and horizontal sizes and the number of filters but also the number of channels. Processing of performing a nonlinear operation after a filter is convoluted in image data (or a feature map) is expressed using a unit called a layer and, for example, expressions such as "a feature map of the nth layer" and "a filter of the nth layer" are used. For example, a CNN that repeats filter convolution and the nonlinear operation three times has a 3-layer network structure. The nonlinear operation processing can be formulated by $$X_n^{(l)} = f\left(\sum_{k=1}^{K} W_n^{(l)} * X_{n-1}^{(l)} + b_n^{(l)}\right) \tag{1}$$

In equation (1), $W_n$ is the filter of the nth layer, $b_n$ is the bias of the nth layer, f is the nonlinear operator, $X_n$ is the feature map of the nth layer, and * is the convolution operator. Note that (l) on the upper right side represents the lth filter or feature map. The filter and the bias are generated by learning to be described later and are collectively referred to as a "network parameter". In the nonlinear operation, for example, a sigmoid function or Rectified Linear Unit (ReLU) is used. In a case of ReLU, the following expression is used.

$$f(X) = \begin{cases} X & \text{if } 0 \le X \\ 0 & \text{otherwise} \end{cases} \tag{2}$$

As indicated by equation (2), negative elements of an input vector X change to zero, and positive elements remain unchanged.

As networks using the CNN, ResNet in the image recognition field and Super Resolution CNN (SRCNN) that is an application in the super-resolution field are well-known. In these networks, a CNN having a multilayered structure is used to perform filter convolution many times, thereby increasing the accuracy of processing. For example, the ResNet has a network structure including a path to short-cut a convolutional layer, and thus implements a multilayer network with one hundred fifty-two layers and implements accurate recognition close to the recognition ratio of human. Note that processing accuracy can be improved by the multilayer CNN simply because a nonlinear relationship between input and output can be expressed by repeating the nonlinear operation many times.

<Learning of CNN>

Learning of the CNN will be described next. Learning of the CNN is performed by minimizing a target function generally expressed by equation (3) below for learning data formed by a set of input learning image (student image) data and its corresponding output learning image (supervisory image) data.

$$L(\theta) = \frac{1}{n}\sum_{i=1}^{n} \|F(X_i;\theta) - Y_i\|_2^2 \quad (3)$$

In equation (3), L is a loss function for measuring an error between a correct answer and an estimation thereof, $Y_i$ is the ith output learning image data, $X_i$ is the ith input learning image data, F is a function collectively representing equation (1) that is an operation performed in each layer of the CNN, θ is the network parameter (the filter and the bias), $\|Z\|_2$ is the L2 norm which, putting it simply, represents the square root of the square sum of the element of a vector Z, and n is the total number of learning data used for learning. In general, since the total number of learning data is large, some of the learning image data are selected at random and used for learning in the stochastic gradient descent (SGD). This can reduce a calculation load in learning using many learning data. As a method of minimizing (=optimizing) the target function, various methods such as the momentum method, the AdaGrad method, the AdaDelta method, and the Adam method are known. The Adam method is given by $$g = \frac{\partial L}{\partial \theta_i^t} \quad (4)$$
$$m = \beta_1 m + (1-\beta_1)g$$
$$v = \beta_2 v + (1-\beta_2)g^2$$
$$\theta_i^{t+l} = \theta_i^t - \alpha\frac{\sqrt{1-\beta_2^t}}{(1-\beta_1)}\frac{m}{(\sqrt{v}+\in\varepsilon)}$$

In equation (4), $\theta_i^t$ is the ith network parameter in the tth iteration, and g is the gradient of the loss function L concerning $\theta_i^t$. In addition, m and v are moment vectors, α is the base learning rate, β1 and β2 are hyperparameters, and ε is a small constant. Note that any method can be used basically because there is no guidance for selecting the optimization method in learning, but it is known that the learning time changes because of the difference in convergence between the methods.

This embodiment assumes that information processing (image processing) of reducing deterioration of a still image is performed using the above-described CNN. An example of a deterioration element of the image is noise. Deterioration restoration processing according to this embodiment is processing of generating or restoring an image without deterioration (or with very little deterioration) from a deteriorated image, and will be referred to as deterioration restoration processing in the following description.

First Embodiment: Inference-Based Approach (Still Image)

In the first embodiment, a method of performing deterioration restoration while reducing signal disappearance, by performing interpolation processing of spreading a positive peak signal of input image data in the first step and performing processing of reducing noise of the input image data in the second step will be described.

Configuration Example of Information Processing System

FIG. 1 is a block diagram showing an example of the hardware configuration of an information processing system according to the first embodiment. The information processing system shown in FIG. 1 includes an edge device 100 that performs deterioration restoration (to be referred to as deterioration restoration inference here after), and a cloud server 200 that performs learning (to be referred to as deterioration restoration learning hereinafter) for performing generation of learning data and restoration of image quality deterioration. The edge device 100 and the cloud server 200 are examples of an information apparatus, and are connected via the Internet to be able to transmit/receive data.

<Hardware Configuration of Edge Device>

The edge device 100 according to this embodiment acquires, as an input image to undergo deterioration restoration processing, RAW image data having a Bayer array, which is input from an image capturing apparatus 10. Note that, in the following description, a term "image" may include an image and image data. Then, noise of the RAW image data is reduced by executing an information processing application program installed in advance. The edge device 100 is an information processing apparatus. The edge device 100 includes a CPU 101, a RAM 102, a ROM 103, a mass storage device 104, a general-purpose I/F 105, a network I/F 106, and a system bus 107. I/F is an abbreviation for interface. The respective components of the edge device 100 are connected by the system bus 107 to be able to transmit/receive data. The edge device 100 is connected to the image capturing apparatus 10, an input device 20, an external storage device 30, and a display device 40 via the general-purpose I/F 105 to be able to transmit/receive data.

The CPU 101 is an abbreviation for Central Processing Unit, and is an arithmetic processing unit. Instead of or in addition to the CPU 101, the edge device 100 may include other processors such as a Micro Processing Unit (MPU), a Graphics Processing Unit (GPU), and a Quantum Processing Unit (QPU). The CPU 101 executes programs stored in the ROM 103, the mass storage device 104, and the like, by using the RAM 102 as a work memory. Thus, the CPU 101 implements various functions, and comprehensively controls the respective components of the edge device 100 via the system bus 107. The edge device 100 may implement various functions by the CPU 101 and other processors. Some or all of the functions of the edge device 100 may be implemented by one or a plurality of circuits such as an Application Specific Integrated Circuit (ASIC) and a Programmable Logic Device (PLD) including a Field Programmable Gate Array (FPGA).

The RAM 102 is an abbreviation for Random Access Memory, and is a high-speed read/write memory. The RAM 102 temporarily stores programs to be executed by the CPU 101 and parameters necessary to execute the programs.

The ROM 103 is an abbreviation for Read Only Memory, and is a nonvolatile storage device that can hold data even in a state in which no power is supplied.

The mass storage device 104 is, for example, a nonvolatile secondary storage device such as a Hard Disk Drive (HDD) and a Solid State Drive (SSD), and stores various kinds of data to be processed by the edge device 100. Based on the instruction of the CPU 101, the mass storage device 104 stores data sent via the system bus 107, and also reads out stored data and transfers the data to the CPU 101, or the like.

The general-purpose I/F 105 is, for example, a serial bus interface such as USB, IEEE 1394, and HDMI®. The edge device 100 acquires data from the external storage device 30 via the general-purpose I/F 105. The external storage device 30 is, for example, one of various kinds of storage media such as a memory card, a CF card, an SD card, and a USB memory. The general-purpose I/F 105 accepts a user instruction from the input device 20 such as a mouse or a keyboard, and outputs it to the CPU 101 or the like. The general-purpose I/F 105 outputs image data and the like processed by the CPU 101 to the display device 40. The display device 40 is, for example, an image display device such as a liquid crystal display and an organic electro luminescence (EL) display. The general-purpose I/F 105 acquires, from the image capturing apparatus 10, data of a captured image such as a RAW image to undergo deterioration restoration processing, and outputs it to the CPU 101.

The network I/F 106 is an interface for connection to a network such as the Internet. For example, the network I/F 106 transmits data to an external device such as the cloud server 200 via the network based on an instruction from the CPU 101.

<Hardware Configuration of Cloud Server>

The cloud server 200 according to this embodiment is an information processing apparatus that provides a cloud service on the Internet. More specifically, the cloud server 200 performs generation of learning data and deterioration restoration learning, and learns a model storing the network parameter of the learning result and a network structure, thereby generating a learned model. Then, the cloud server 200 provides the learned model in response to a request from the edge device 100. The cloud server 200 includes a CPU 201, a ROM 202, a RAM 203, a mass storage device 204, and a network I/F 205, and the respective components are connected to each other by a system bus 206.

The CPU 201 controls the operation of the entire cloud server 200 by reading out control programs stored in the ROM 202, the mass storage device 204, and the like to implement various functions and executing various kinds of processes. Instead of or in addition to the CPU 201, the cloud server 200 may include other processors such as an MPU, a GPU, and a QPU.

The ROM 202 stores programs to be executed by the CPU 201, and the like.

The RAM 203 is used as the main memory of the CPU 201 and a temporary storage area such as a work area.

The mass storage device 204 is a nonvolatile secondary storage device such as an HDD and an SSD that stores data of image data, various kinds of programs, and parameters necessary to execute the programs.

The network I/F 205 is an interface for connection to the Internet. The network I/F 205 provides the above-described network parameter in response to a request from the Web browser of the edge device 100.

<Configuration of Image Capturing Apparatus>

The image capturing apparatus 10 includes, for example, a Single Photon Avalanche Diode (SPAD) sensor as an image sensor. The SPAD sensor is an element that amplifies, by avalanche multiplication, charges generated by photoelectric conversion and outputs them as electrical signals. The avalanche multiplication is a phenomenon in which electrons accelerated by the electric field in the impurity diffusion region of the p-n junction collide as lattice atoms to cut the connectors, the thus newly generated electrons further collide against other lattice atoms to cut the connectors repeatedly, and thus the current is multiplied. The SPAD sensor is a photon-counting image sensor. The SPAD sensor discretely counts the number of photons, and excludes the influence of electrical noise (readout noise), thereby converting a small amount of detected light into a signal and amplifying it. Thus, the SPAD sensor can capture an object even in the dark.

Note that there exist components of the edge device 100 and the cloud server 200 in addition to the above-described components but a description thereof will be omitted. This embodiment assumes that a learned model obtained as a result of performing generation of learning data and deterioration restoration learning by the cloud server 200 is downloaded to the edge device 100 and the edge device 100 performs deterioration restoration inference for input image data 114 as a processing target. Note that the above-described system configuration is merely an example, and the present invention is not limited to this. For example, the functions of the cloud server 200 may be subdivided and different apparatuses may execute generation of learning data and deterioration restoration learning, respectively. Alternatively, the image capturing apparatus 10 having the functions of the edge device 100 and the functions of the cloud server 200 may be configured to perform all of generation of learning data and deterioration restoration learning.

<Functional Blocks of Entire System>

Figure 2:
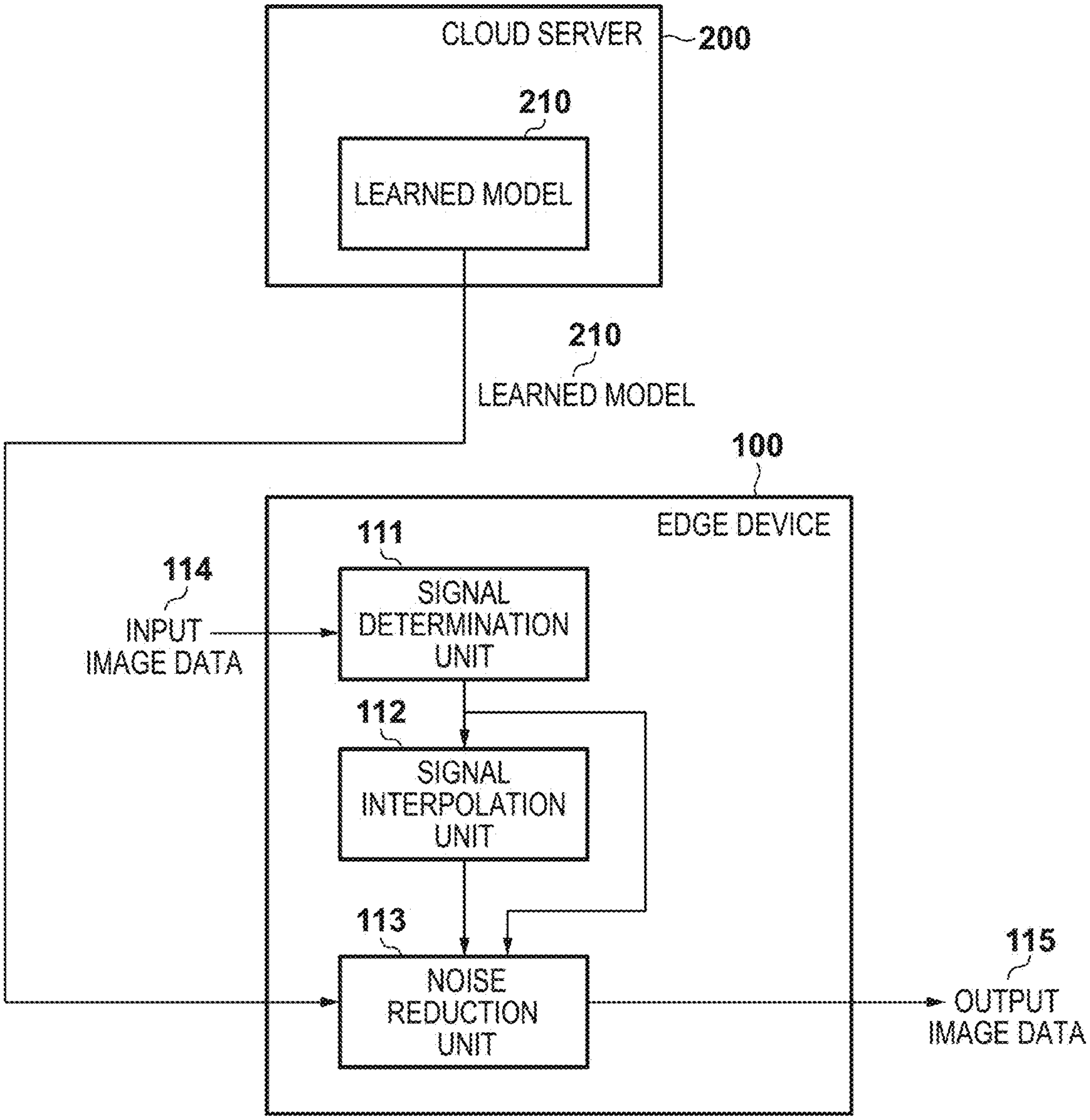
FIG. 2 is a block diagram showing the functional configuration of the information processing system according to the first embodiment.

The functional configuration of the entire information processing system according to this embodiment will be described next with reference to FIG. 2. FIG. 2 is a functional block diagram showing the functional configuration of the information processing system. The cloud server 200 holds a learned model 210 learned, by deterioration restoration learning, to restore deterioration occurring in the image capturing apparatus 10. The cloud server 200 transmits the learned model 210 to the edge device 100 in response to a request from the edge device 100, or the like. In this embodiment, the learning method is not included in the gist of the present invention, and a detailed description thereof will be omitted.

Note that the configuration shown in FIG. 2 can appropriately be modified or changed. For example, one function unit may be divided into a plurality of function units, or two or more function units may be integrated into one function unit. The configuration shown in FIG. 2 may be implemented by two or more apparatuses. In this case, the apparatuses are connected via a circuit or a wired or wireless network and perform cooperative operations by performing data communication with each other, thereby implementing each processing according to this embodiment.

The respective function units of the edge device 100 will be described in detail below. As shown in FIG. 2, the edge device 100 includes a signal determination unit 111, a signal interpolation unit 112, and a noise reduction unit 113.

The signal determination unit 111 acquires the input image data 114 including a pixel (an example of a target pixel) of a local positive peak signal. The signal determination unit 111 may acquire, for example, the input image data 114 captured by the photon-counting image sensor in a low-illuminance environment, in which black floating occurs. The signal determination unit 111 determines, for each local region of the input image data 114, whether the pixels of the local positive peak signals sparsely exist. In this embodiment, a RAW image captured by a color filter having a Bayer array is used. The positive peak signals will be described first with reference to FIGS. 3A and 3B.

Figure 3A:
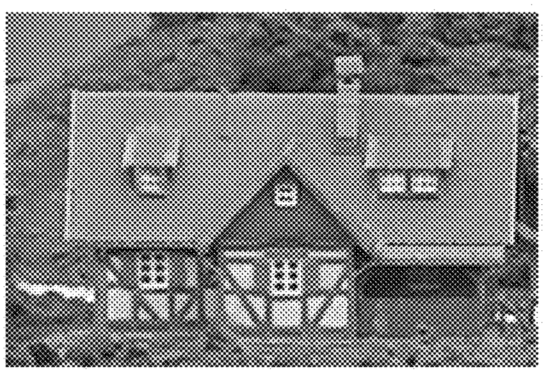
FIG. 3A is a view showing an image captured with a low gain in an environment in which the illuminance is sufficiently high.
Figure 3B:
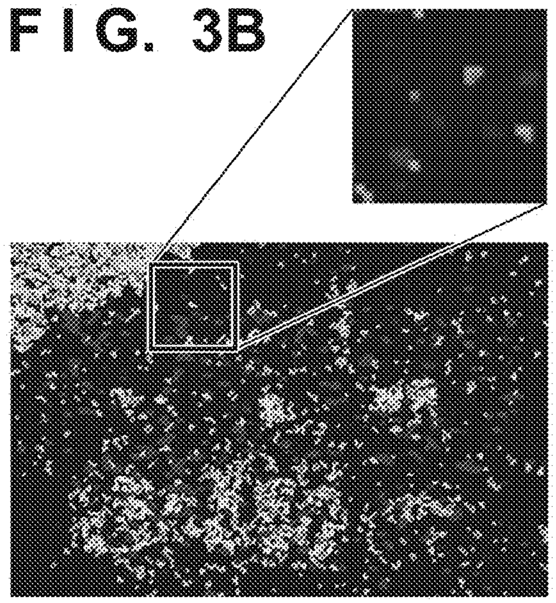
FIG. 3B is a view showing an image captured by increasing the gain in a dark low-illuminance environment.

The positive peak signals in image capturing with a low gain and image capturing with a high gain will be described with reference to FIGS. 3A and 3B. FIGS. 3A and 3B are views each for explaining the positive peak signals.

FIG. 3A is a view showing an image captured with a low gain in an environment in which the illuminance is sufficiently high. Since it is easy to detect photons in this environment, a clear enough result is obtained by image capturing with a low gain. However, in a low-illuminance environment darker than starlight, it is necessary to perform image capturing by increasing the gain (sensitivity).

FIG. 3B is a view showing an image captured by increasing the gain in a dark low-illuminance environment. Note that FIG. 3B shows an image obtained by capturing almost the same place as in FIG. 3A. A positive peak signal may be a signal spreading over a plurality of pixels. Note that the positive peak signal may be the signal of a single pixel. The peripheral pixels of the target pixel having the local positive peak signal each has a value close to the output level (black level) of the image capturing apparatus in a case when there is no incident light. A signal close to the black level may be, for example, a signal whose signal strength (to be also called a magnitude) is equal to or smaller than a predetermined level threshold. The positive peak signal is, for example, a signal existing within a rectangle shown in FIG. 3B. There exist a pixel in which at least one photon can be detected and a pixel in which no photon can be detected, the former is applied with avalanche multiplication and the gain, and thus the image includes sparse local positive peak signals. In addition, since the SPAD sensor does not cause readout noise that cannot be ignored at the time of image capturing with a high gain, and only a signal is mainly applied with the gain, the black level remains unchanged even at the time of image capturing with a high gain. On the other hand, if the image capturing apparatus including the CMOS sensor performs image capturing with a high gain, the influence of readout noise causes fading of a black color in which a pixel that should originally be at the black level is bright, and the peak signal is buried in noise.

The signal determination unit 111 refers to setting values such as a gain value and an exposure value set in the image capturing apparatus 10, and determines, based on the setting values, whether the acquired image includes the positive peak signal.

In an environment in which the illuminance is low, it is impossible to visually recognize an object unless the object is captured by setting a high gain. As the gain is higher, the positive peak signal appears more conspicuously.

If the input image data 114 includes the positive peak signal, the signal interpolation unit 112 interpolates a signal (an example of an interpolation signal) to a peripheral pixel as a pixel around the target pixel of the input image. For example, the signal interpolation unit 112 interpolates the signal to a peripheral pixel of the black level and a peripheral pixel close to the black level by spreading the local positive peak signal to the surroundings.

The signal interpolation unit 112 performs smoothing by the weighted average of the peripheral pixels of the target pixel using correlation information in the spatial direction with the plurality of peripheral pixels for the target pixel of the local positive peak signal. A region around the target pixel may be a predetermined setting region. The signal interpolation unit 112 performs smoothing for all the pixels of the input image data 114 to interpolate the positive peak signals of the entire image to the peripheral pixels.

The purpose of the interpolation is to reduce the difficulty of the task of interpolation processing and to specialize in the task of noise reduction processing performed by the noise reduction unit 113 of the succeeding stage. Therefore, in smoothing, the signal interpolation unit 112 attempts to maintain the positive peak signal as much as possible, and to transmit signal information to the pixels close to the black level around the positive peak signal. The signal interpolation unit 112 applies, for example, edge-preserving filter processing as smoothing for maintaining the peak signal.

Note that the peripheral pixels to be interpolated assume the isotropy of the peak signal, and it is thus better not to have anisotropy. This is to suppress the peak signal from having directivity, and to prevent an unnatural signal from remaining in the result of the noise reduction processing of the succeeding stage.

The noise reduction unit 113 performs processing (also to be also referred to as noise reduction processing here after) of reducing noise for the input image data 114 in which the interpolation signal generated from the positive peak signal, and the like, has been interpolated by the signal interpolation unit 112. The noise reduction unit 113 repeats a convolution operation and a nonlinear operation by the filters given by equations (1) and (2) using the CNN a plurality of times, and outputs output image data 115 using a model obtained by learning the deterioration restoration processing.

Figure 4A:
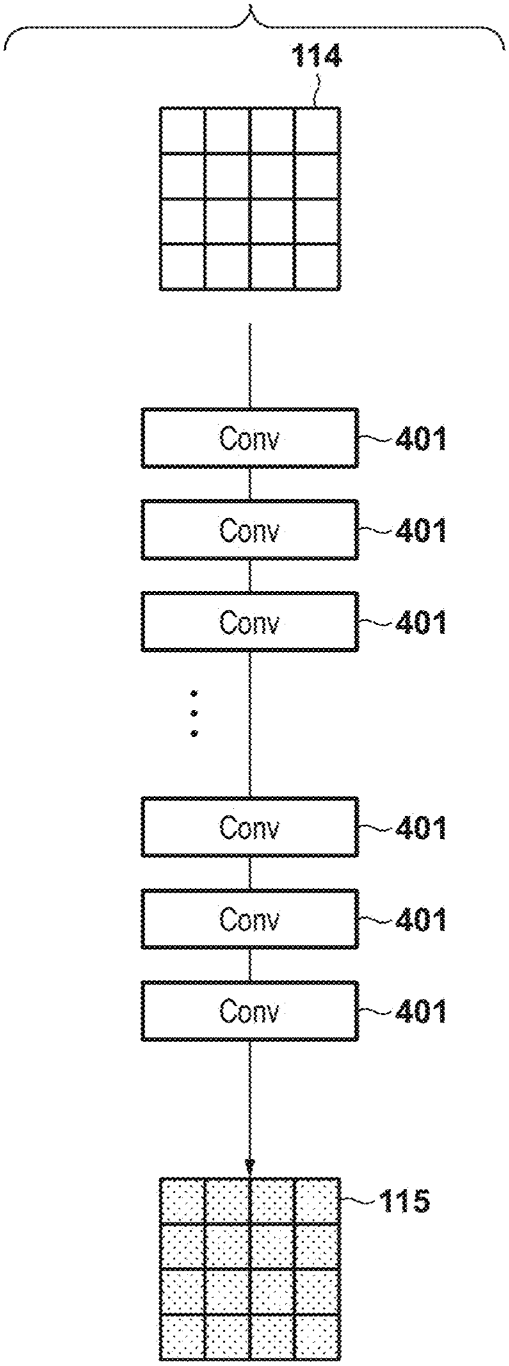
FIG. 4A is a view for explaining the structure of the first CNN and the procedure of learning and inference.

FIG. 4A is a view for explaining the structure of the CNN and the procedure of learning and inference. As shown in FIG. 4A, the CNN used in this embodiment includes a plurality of filters 401. The noise reduction unit 113 sequentially applies the filters 401 to the input data, and calculates a feature map (not shown). Then, the noise reduction unit 113 outputs the output image data 115 having the same number of channels as that of the input image data 114 from the final filter.

Figure 5A:
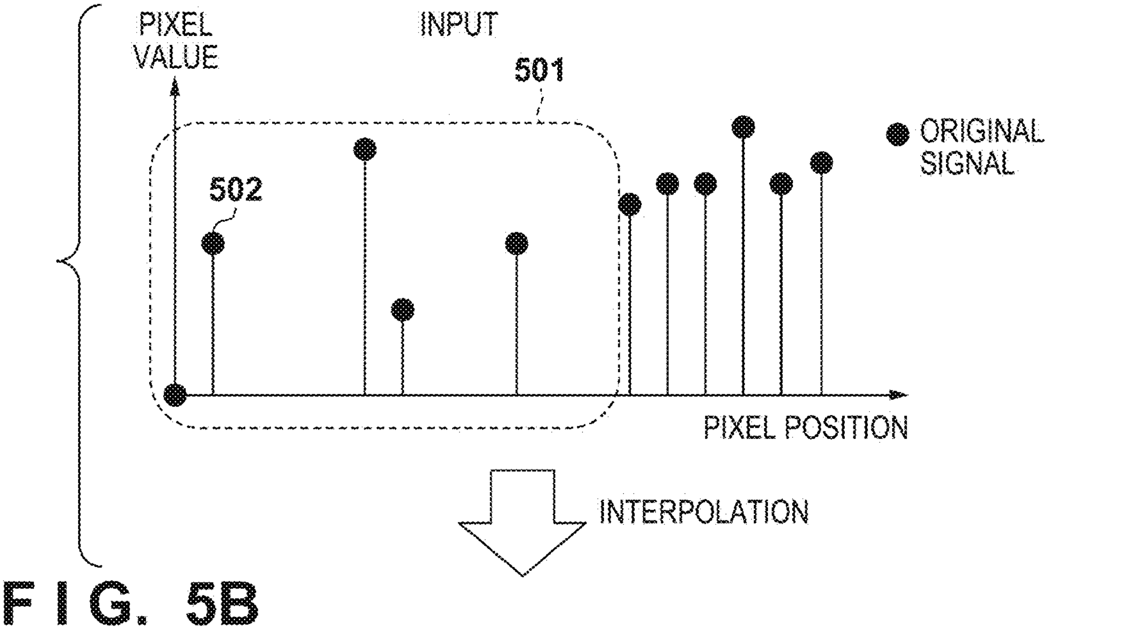
FIG. 5A is a view showing the signal values (pixel values) of pixels of one horizontal line in a local region of input image data.
Figure 5B:
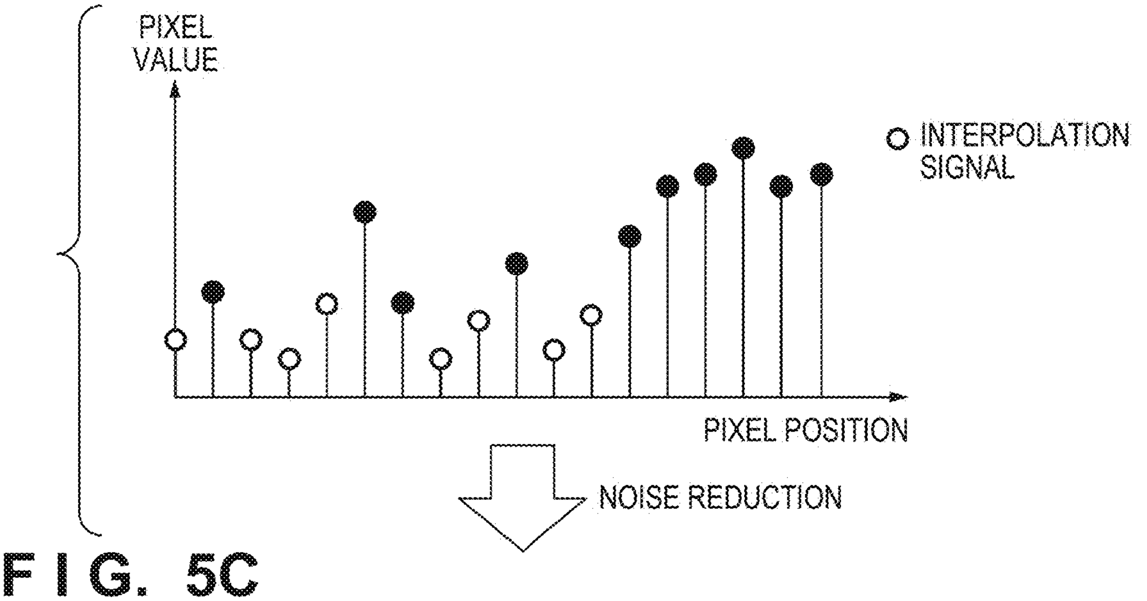
FIG. 5B is a view showing a result obtained when an N×N smoothing filter is applied to the condition shown in FIG. 5A as interpolation processing performed by a signal interpolation unit.
Figure 5C:
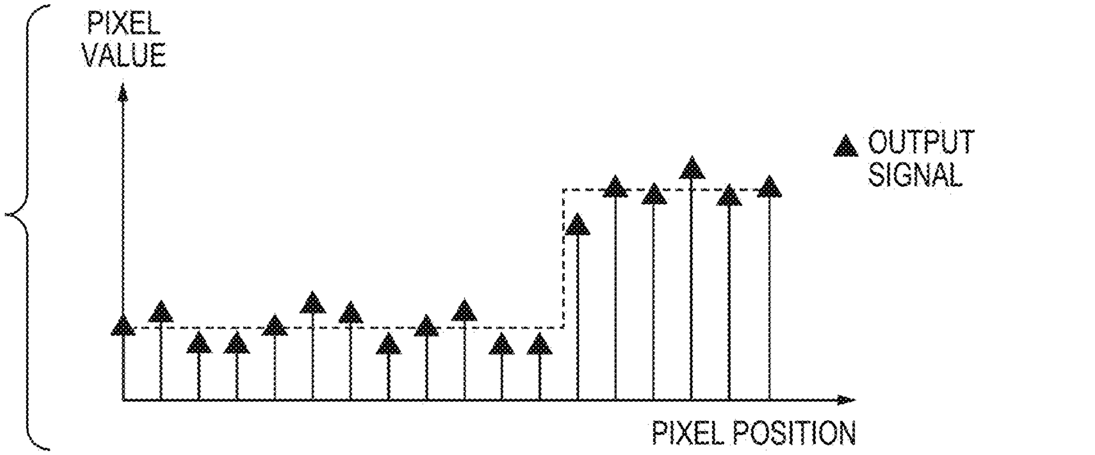
FIG. 5C is a view showing a result obtained when a noise reduction unit performs noise reduction processing for the condition shown in FIG. 5B using a learned model.

The procedure until now will be described with reference to FIGS. 5A to 5C. FIGS. 5A to 5C are views for explaining signal interpolation and noise reduction according to the first embodiment. In FIGS. 5A to 5C, the abscissa represents a pixel position and the ordinate represents the pixel value of each pixel. Note that the ordinate may represent the luminance.

FIG. 5A shows the signal values (pixel values) of pixels of one horizontal line in a local region of the input image data. In FIG. 5A, black circles indicate existing original signals. In a region 501 surrounded by a dotted line, for example, a predetermined pixel value is held like a pixel 502, and the pixel 502 whose peripheral pixels have pixel values close to the black level is the target pixel of the sparse local positive peak signal. The pixel 502 may include a single pixel or a plurality of pixels.

FIG. 5B shows a result obtained when an N×N (for example, N=3) smoothing filter is applied to the condition shown in FIG. 5A as interpolation processing performed by the signal interpolation unit 112. In FIG. 5B, black circles indicate existing original signals and white signals indicate interpolation signals generated when the original signals spread by the smoothing processing. When the positive peak signal spreads to the surroundings, the pixel close to the black level is added with the information of the original signal.

FIG. 5C shows a result obtained when the noise reduction unit 113 performs noise reduction processing for the condition shown in FIG. 5B using the learned model. In FIG. 5C, black triangles indicate output signals obtained by reducing noise. When the variation of the pixels is reduced by noise reduction processing, the visibility of an edge (a broken line in FIG. 5C) that was difficult to be visually recognized at the time of the input image is improved.

<Procedure of Processing of Entire System>

Figure 6:
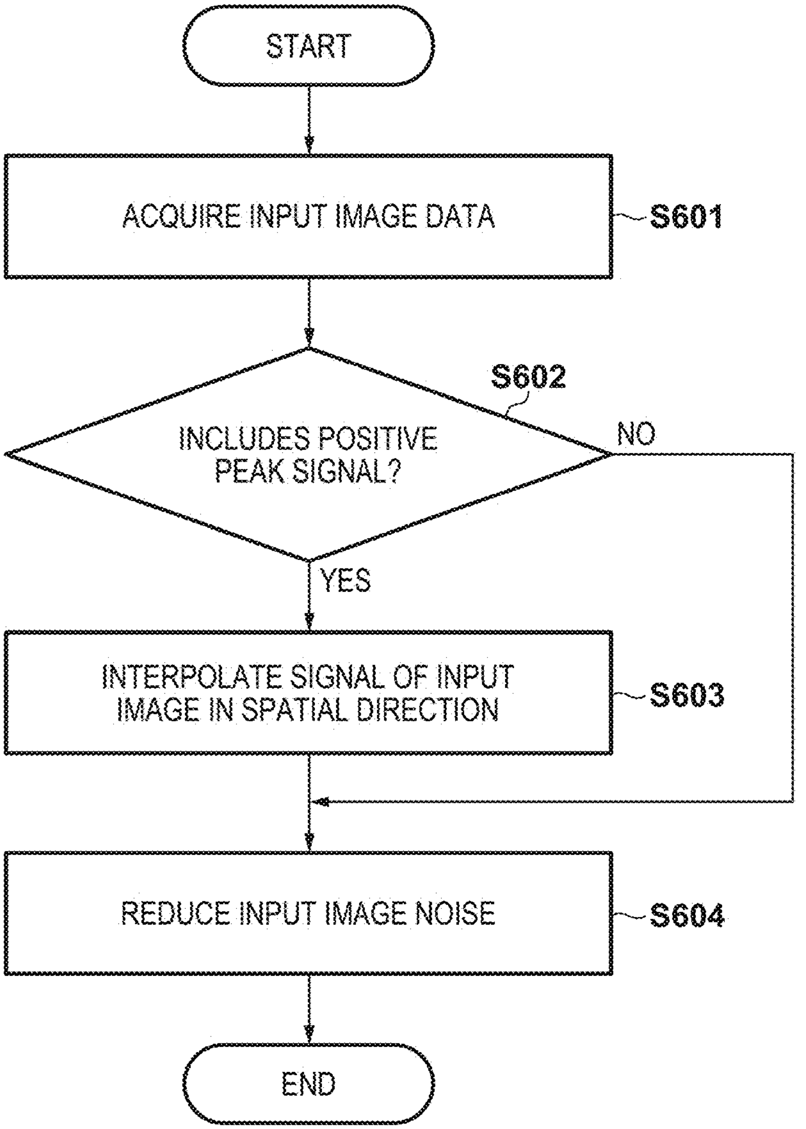
FIG. 6 is a flowchart illustrating the procedure of processing according to the first embodiment.

Various kinds of processes performed in the information processing system according to this embodiment will be described next with reference to FIG. 6. FIG. 6 is a flowchart illustrating the procedure of processing in the information processing system according to this embodiment. Each process shown in FIG. 6 is executed by each function unit shown in FIG. 2 implemented when the CPU 101 executes the computer program of image processing according to this embodiment. Note that all or some of the function units shown in FIG. 2 may be implemented by hardware. The following description will be provided along the flowchart shown in FIG. 6. Note that, in the following description, a symbol "S" indicates a processing step.

In step S601, the signal determination unit 111 acquires the input image data 114 as a processing target. For example, the signal determination unit 111 may directly acquire the input image data captured by the image capturing apparatus 10 or read out the input image data captured in advance and stored in the mass storage device 104.

In step S602, the signal determination unit 111 determines whether the input image data 114 includes the local positive peak signal. If the signal determination unit 111 determines that the local positive peak signal is included, the process advances to step S603. If the signal determination unit 111 determines that no local positive peak signal is included, the process advances to step S604.

In step S603, if the input image data 114 includes the target pixel of the local positive peak signal, the signal interpolation unit 112 interpolates the signal of the input image in the spatial direction. For example, based on the smoothing processing by the weighted average, the signal interpolation unit 112 performs smoothing by interpolating the signal in the input image data 114 so that the signal spreads to a pixel close to the black level, which is a peripheral pixel of the pixel of the local positive peak signal.

In step S604, the noise reduction unit 113 reduces noise of the input image data 114 in which the signal interpolation unit 112 has interpolated the signal by performing the smoothing processing. Then, the noise reduction unit 113 outputs, as the output image data 115, the image data obtained after the noise is reduced.

The procedure of the entire processing performed in the information processing system according to this embodiment has been described above.

The first embodiment has explained a method of performing deterioration restoration of the input image while reducing signal disappearance, by performing two-step processing of interpolating the positive peak signal of the input image data to the surroundings and reducing noise of the input image data.

The characteristic of having the positive peak signal generated at the time of image capturing with a high gain is specific to the image capturing apparatus with the SPAD sensor, and a signal in an output image has often disappeared at the time of image capturing in a low-illuminance environment until now.

On the other hand, as in this embodiment, it is possible to implement deterioration restoration by reducing noise while reducing disappearance of the local positive peak signal in the image and maintaining the signal by executing the deterioration restoration task including interpolation processing and noise reduction processing in the order of the interpolation processing and the noise reduction processing. As a use case of this embodiment, a case when handheld shooting is performed in a low-illuminance environment is assumed.

In this embodiment, since the presence/absence of the local positive peak signal is determined based on the setting values of the image capturing apparatus 10, the determination processing can be executed at a high speed.

Note that this embodiment assumes that the RAW image data captured by the color filter having the Bayer array is used as the input image data but image data obtained using another color filter array may be used. The input image data may be one of RGB image data obtained by performing development processing for a RAW image, YUV image data converted from the RGB image data, and JPEG image data having undergone compression processing.

Note that, in this embodiment, the presence/absence of the target pixel having the local positive peak signal is determined based on the setting values of the image capturing apparatus 10, but the determination method is not limited to this. For example, the signal determination unit 111 may determine the presence/absence of the local positive peak signal based on one of the pixel value and the luminance. More specifically, the signal determination unit 111 may compare, with a preset pixel threshold, pixel value differences between a pixel of interest having the positive peak signal in the input image data 114 as a determination target and a plurality of pixels located in a predetermined peripheral region including the pixel of interest, determine, if there exist many pixels whose pixel value differences are equal to or greater than the pixel threshold, the pixel of interest as the target pixel of the local positive peak signal, and perform this processing for all the pixels, thereby performing the determination processing. Alternatively, the signal determination unit 111 may compare, with a preset luminance threshold, luminance differences between a pixel of interest in the input image data 114 as the determination target and a plurality of pixels in a predetermined peripheral region including the pixel of interest, determine, if there exist many pixels whose luminance differences are equal to or larger than the luminance threshold, the pixel of interest as the target pixel of the local positive peak signal, and perform this processing for all the pixels, thereby performing the determination processing. Thus, in this embodiment, the presence/absence of the local positive peak signal can be determined accurately for each input image.

At this time, the signal determination unit 111 may determine whether there exist many pixels by majority decision or by determining whether the ratio of the pixels, in the predetermined region, whose differences are equal to or greater than the threshold exceeds a ratio threshold (for example, 70%). In other words, the noise reduction unit 113 determines that the positive peak signal is local as the ratio of the positive peak signal in the predetermined peripheral region around the pixel of interest is higher, and preserves the pixel as the target pixel.

Note that this embodiment has explained an example in which the signal interpolation unit 112 performs, as interpolation processing to the peripheral pixels of the positive peak signal, smoothing by the weighted average of the peripheral pixels for all the pixels, but the similar smoothing processing may be performed only for the target pixel determined as the local positive peak signal. Alternatively, the signal interpolation unit 112 may duplicate the target pixel determined as the local positive peak signal to a neighboring pixel included in the predetermined peripheral setting region, and interpolate the interpolation signal to the peripheral pixels. At this time, a weight corresponding to the distance between the pixel having the positive peak signal and the duplicated pixel may be provided, and the strength of the interpolation signal may be determined. For example, when D represents the distance, a weight Wis set by $W=C\times 1/D$. C represents a predetermined correction coefficient. Furthermore, the interpolation processing may be executed by a Gaussian filter.

Note that this embodiment has explained the processing of reducing noise using the CNN but the present invention is not limited to this. For example, edge-preserving noise reduction processing or rule-based noise reduction processing such as patch-based noise reduction processing may be applied.

Second Embodiment: Inference-Based Approach (Moving Image)

The first embodiment has explained a case when the input image data includes one frame. In the case of one frame, it is difficult to distinguish between a locally generated positive peak signal and impulse noise, and the impulse noise may remain. The impulse noise is a sudden change in pixel value caused by a flaw in a sensor, or the like, and is noise displayed as random pixels close to black and white, which is also called salt-and-pepper noise.

To solve this problem, the second embodiment will describe an example of deterioration restoration processing of improving the determination accuracy of both the positive peak signal and the impulse noise by using input image data of a plurality of frames. Note that a description of components common to those described in the first embodiment among the basic components of an information processing system will be omitted, and differences will mainly be described below.

Figure 7:
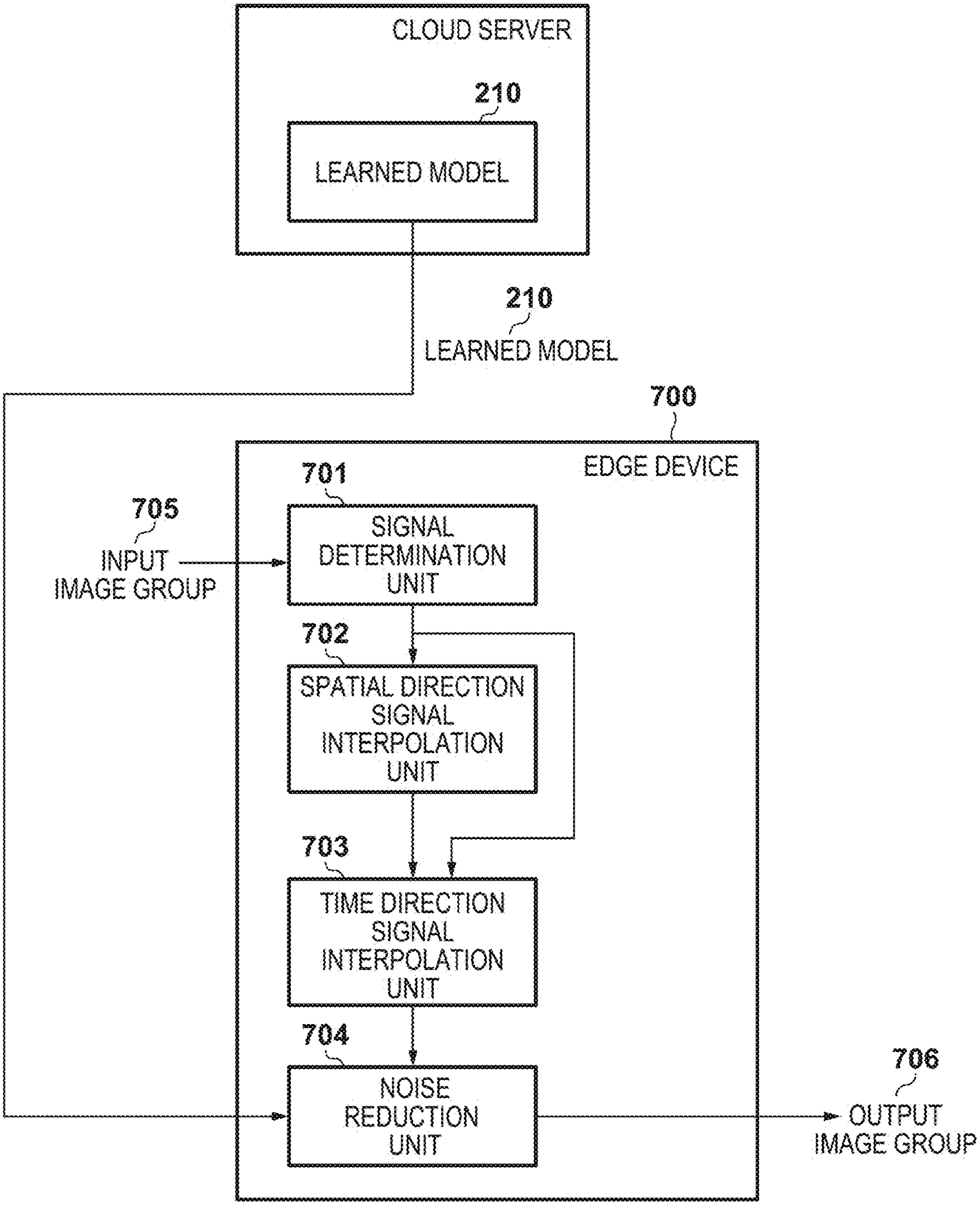
FIG. 7 is a block diagram showing the functional configuration of an information processing system according to the second embodiment.

FIG. 7 is a block diagram showing the functional configuration of an information processing system according to the second embodiment. As shown in FIG. 7, an edge device 700 of the information processing system according to the second embodiment includes a signal determination unit 701, a spatial direction signal interpolation unit 702, a time direction signal interpolation unit 703, and a noise reduction unit 704.

The signal determination unit 701 acquires an input image group 705 including images of a plurality of frames that are chronologically (or temporally) adjacent (or continuous) to each other. The signal determination unit 701 determines, for each of the acquired frames, based on the setting values of a camera, whether a local positive peak signal exists in at least one of the time direction and the spatial direction. At this time, it is difficult for the signal determination unit 701 to discriminate between the positive peak signal to be preserved or impulse noise to be deleted. To solve this problem, the signal determination unit 701 may refer to the positive peak signals at the identical pixel positions in the plurality of frames adjacent to the frame of interest, and determine, based on the occurrence frequency of the positive peak signal, whether the positive peak signal is a signal to be preserved. For example, the signal determination unit 701 may determine, as the positive peak signal to be preserved, the positive peak signal existing in a large number of frames, and determine the signal that exists only in a small number of frames as the positive peak signal not to be preserved, that is, impulse noise.

The spatial direction signal interpolation unit 702 performs interpolation processing similar to that of the first embodiment for the frame including the positive peak signal in the input image group 705, and interpolates a signal around the positive peak signal.

The time direction signal interpolation unit 703 also performs, in the time direction, the interpolation processing, which has been performed in the spatial direction, for the frame including the positive peak signal in the input image group 705. More specifically, the time direction signal interpolation unit 703 calculates the weighted average of signals at the identical pixel positions in M (for example, M=3) frames that are temporally adjacent (or continuous) to the target frame, thereby performing interpolation processing.

The noise reduction unit 704 reduces noise from the image in which the positive peak signal has been interpolated by the spatial direction signal interpolation unit 702 and the time direction signal interpolation unit 703, thereby outputting an output image group 706.

Figures 8A, 8B, 8C:
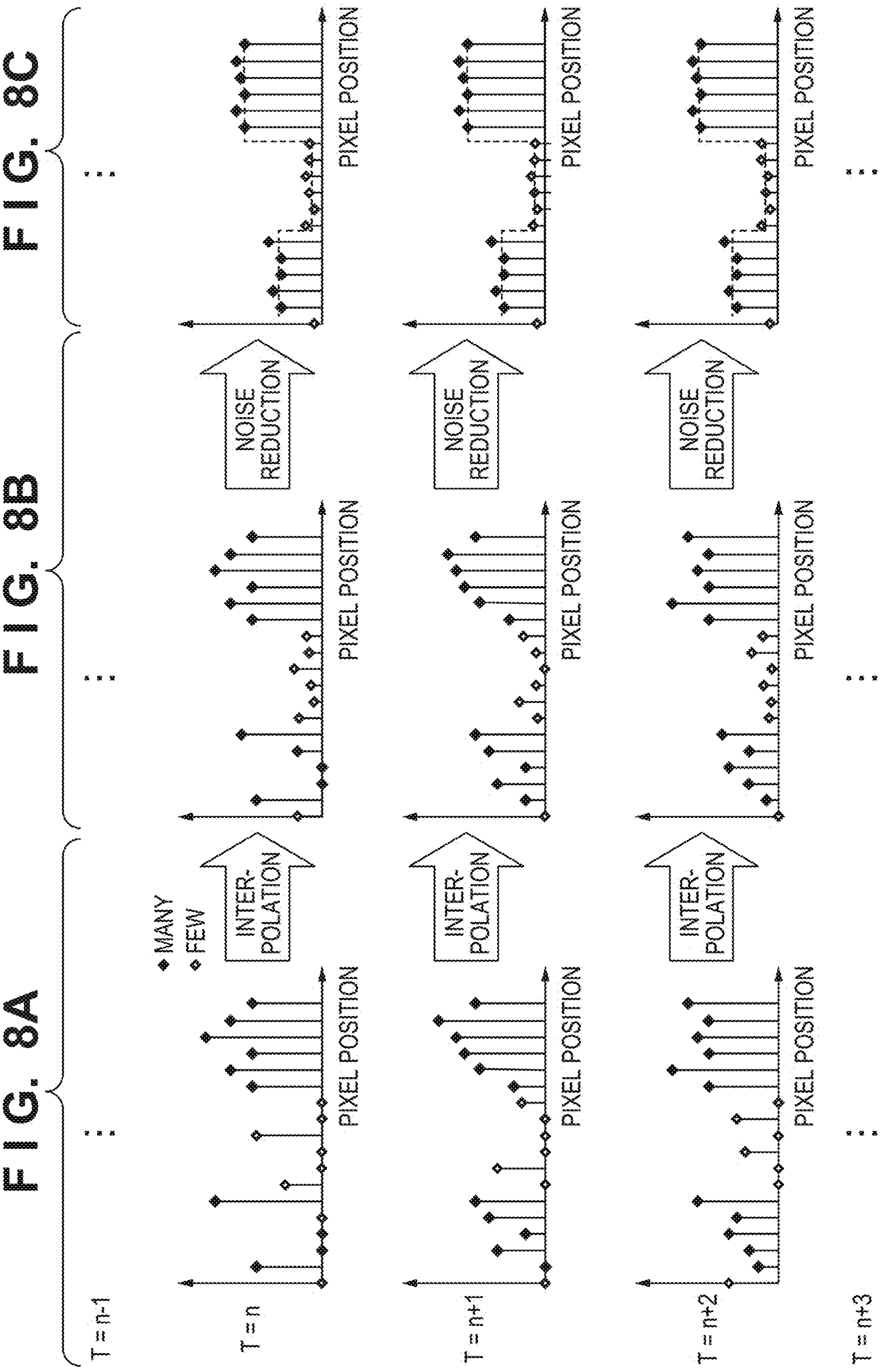
FIG. 8A is a view showing the pixel values of pixels of one line in the horizontal direction in a frame at each time T.
FIG. 8B is a view showing a result obtained when, for the condition shown in FIG. 8A, a spatial direction signal interpolation unit performs interpolation processing in the spatial direction and a time direction signal interpolation unit performs interpolation processing in the time direction.
FIG. 8C is a view showing a result obtained when a noise reduction unit performs noise reduction processing for the condition shown in FIG. 8B.

The procedure until now will be described in detail with reference to FIGS. 8A to 8C. FIGS. 8A to 8C are views for explaining signal interpolation and noise reduction according to the second embodiment.

FIG. 8A shows the signal values of pixels of one line in the horizontal direction in a frame at each time T. With reference to the identical pixel positions in the three frames, a signal existing in a large number of frames is a true signal (a black rhombus in FIG. 8A) including the positive peak signal and a signal existing only in a small number of frames is impulse noise (a white rhombus in FIG. 8A).

FIG. 8B shows a result obtained when, for the condition shown in FIG. 8A, the spatial direction signal interpolation unit 702 performs the interpolation processing in the spatial direction and the time direction signal interpolation unit 703 performs the interpolation processing in the time direction. Thus, the peak signal spreads to the surroundings in the spatial direction and the time direction and is interpolated to the pixels close to the black level.

FIG. 8C shows a result obtained when the noise reduction unit 704 performs noise reduction processing for the condition shown in FIG. 8B. When the noise reduction unit 704 performs noise reduction processing, the variation of the pixels is reduced. This improves the visibility of an edge (a broken line in FIG. 8C) that was difficult to be visually recognized at the time of the input image.

<Procedure of Processing of Entire System>

Figure 9:
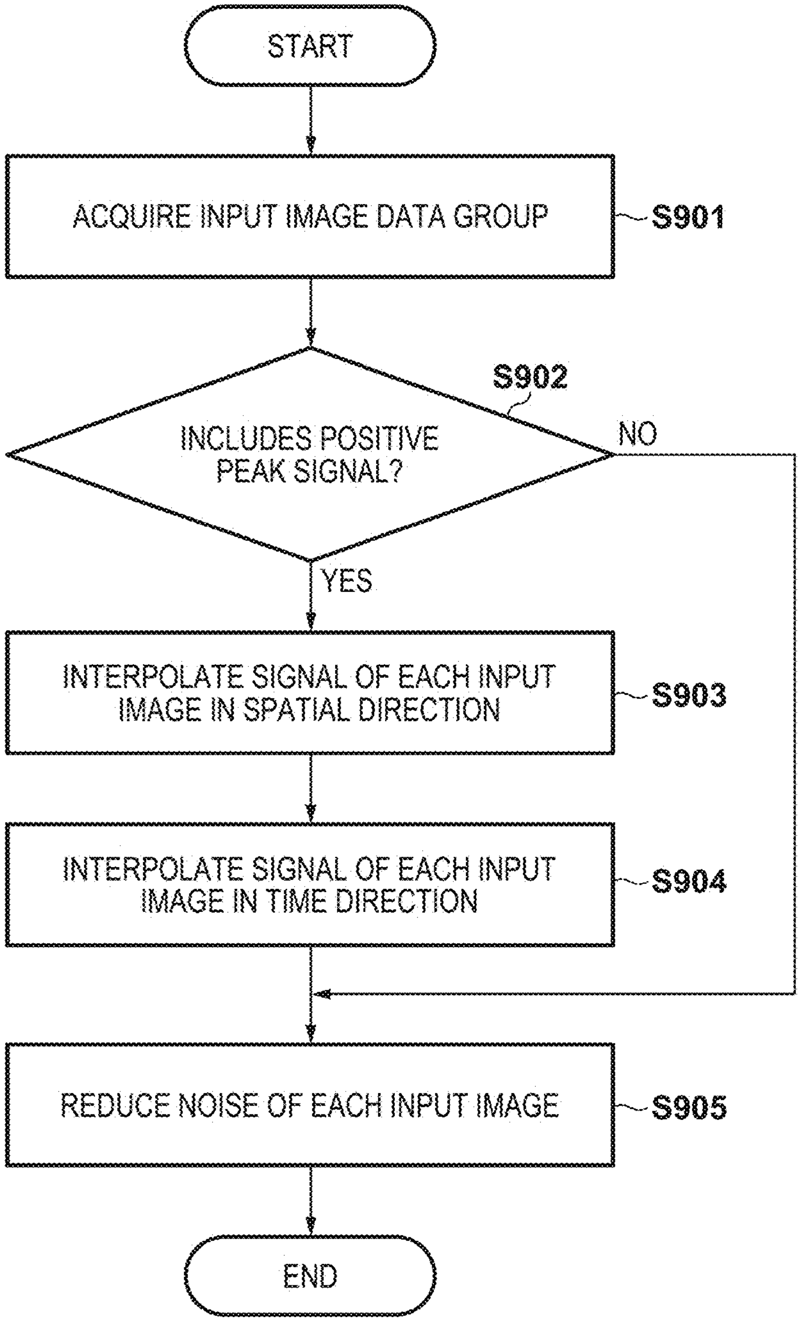
FIG. 9 is a flowchart illustrating the procedure of processing according to the second embodiment.

Various kinds of processes performed in the information processing system according to the second embodiment will be described next with reference to FIG. 9. FIG. 9 is a flowchart illustrating the procedure of processing in the information processing system according to the second embodiment. Each process shown in FIG. 9 is executed by each function unit implemented when the CPU 101 executes a computer program corresponding to each process.

In step S901, the signal determination unit 701 acquires the input image group 705 as a processing target.

In step S902, the signal determination unit 701 determines, for each frame of the input image group 705, whether the local positive peak signal is included in at least one of the spatial direction and the time direction. If the signal determination unit 701 determines that each frame includes the positive peak signal, the process advances to step S903. If the signal determination unit 701 determines that each frame includes no positive peak signal, the process advances to step S905.

In step S903, the spatial direction signal interpolation unit 702 performs, for the input image of the frame including the positive peak signal among the frames of the input image group 705, smoothing processing by the weighted average, and interpolates an interpolation signal generated from the peak signal and the like in the spatial direction.

In step S904, the time direction signal interpolation unit 703 performs, for the input image of the frame including the positive peak signal among the frames of the input image group 705, smoothing processing by the weighted average with reference to the signals at the identical pixel positions in other frames that are chronologically adjacent to each other, and interpolates an interpolation signal generated from the peak signal and the like in the time direction.

In step S905, the noise reduction unit 704 reduces noise of each input image of the input image group 705 in which the spatial direction signal interpolation unit 702 and the time direction signal interpolation unit 703 have interpolated the interpolation signals. Then, the noise reduction unit 704 outputs, as the output image group 706, all the frames obtained after the noise is reduced.

The procedure of the entire processing performed in the information processing system according to this embodiment has been described above.

In the second embodiment, if any of the frames of the input image group includes the local positive peak signal, interpolation processing of interpolating the interpolation signal by spreading the positive peak signal in the spatial direction and interpolation processing of interpolating the interpolation signal by spreading the positive peak signal in the time direction are performed. This embodiment implements deterioration restoration while reducing signal disappearance by reducing noise of the input image group after performing the two interpolation processes.

As described above, according to this embodiment, accuracy of discrimination between a true signal and impulse noise that is difficult in a case of one frame is improved by using a plurality of frames that are temporally adjacent to each other. In this embodiment, this can reduce noise and maintain the signal while suppressing the influence of impulse noise. As a use case of this embodiment, a case when one high-quality frame is generated from a plurality of frames captured chronologically continuously with a high gain in a low-illuminance environment or a case when a monitoring video in a low-illuminance environment is increased in sharpness is considered.

Note that, in this embodiment, the weighted average is calculated as processing of interpolating the signal in the time direction, but the present invention is not limited to this and processing of interpolating the signal that exclusively exists may be performed. This increases the risk of leaving impulse noise but acts in the direction of preserving the peak signal and thus has the effect of minimizing disappearance of information.

Note that this embodiment has explained the processing of spreading the positive peak signal to the surroundings by explicitly separating the spatial direction and the time direction, but the processing may be performed in the space-time direction. Furthermore, at this time, in this embodiment, interpolation processing may be performed only for the target pixel having the positive peak signal and its peripheral pixels.

Third Embodiment: Learning-Based Approach

Each of the first and second embodiments has explained an example of performing noise reduction using the neural network after spreading the positive peak signal. This uses a model that has learned noise reduction using a pair of a supervisory image and an image obtained by adding noise to the supervisory image. As described above, in an image including the local positive peak signal, it is difficult to discriminate between the task of noise reduction processing and the task of interpolation processing. In each of the first and second embodiments, preprocessing is performed so the signal does not disappear at the time of inference but it is possible to improve the accuracy of deterioration restoration by also performing preprocessing at the time of learning.

In the third embodiment, a local positive peak signal is reproduced by adding noise to a supervisory image, and a student image is generated by spreading the peak signal in at least one of the spatial direction and the time direction. Then, the third embodiment will describe an example of generating a model by performing learning to reduce noise by using a pair of the supervisory image and the student image. Note that a description of contents common to the components described in the first and second embodiments among the basic components of an information processing system will be omitted, and differences will mainly be described below.

<Functional Blocks of Entire System>

Figure 10:
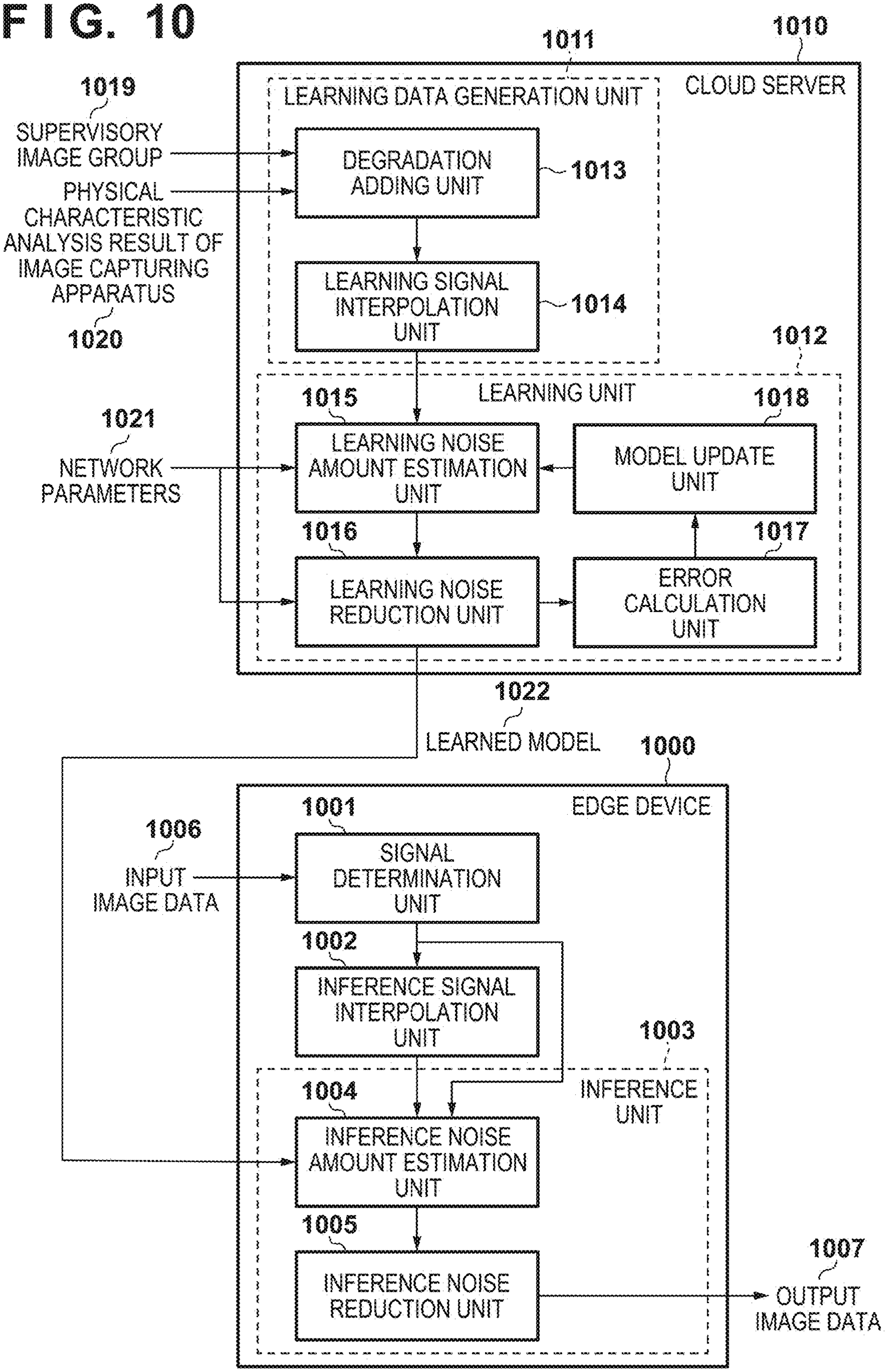
FIG. 10 is a block diagram showing the functional configuration of an information processing system according to the third embodiment.

The functional configuration of the entire information processing system according to this embodiment will be described with reference to FIG. 10. FIG. 10 is a block diagram showing the functional configuration of the information processing system according to the third embodiment. The information processing system according to this embodiment includes an edge device 1000 and a cloud server 1010.

The function units of the edge device 1000 will be described in detail. The edge device 1000 includes a signal determination unit 1001, an inference signal interpolation unit 1002, and an inference unit 1003. The inference unit 1003 includes an inference noise amount estimation unit 1004 and an inference noise reduction unit 1005.

The signal determination unit 1001 and the inference signal interpolation unit 1002 have the same functions as those of the signal determination unit 111 and the signal interpolation unit 112 of the first embodiment, respectively.

The inference unit 1003 estimates the noise amount of input image data 1006 using a learned model 1022 received from the cloud server, and performs deterioration restoration inference based on the estimation result. The learned model 1022 is a neural network that performs estimation of the noise amount and deterioration restoration. The deterioration restoration inference is performed by the inference noise amount estimation unit 1004 and the inference noise reduction unit 1005.

Figure 11A:
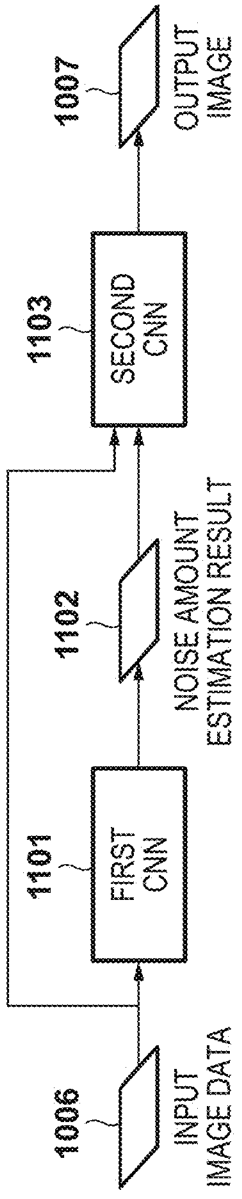
FIG. 11A is a view for explaining the procedure of inference according to the third embodiment.

Details of the inference unit 1003 will be described with reference to FIG. 11A. FIG. 11A is a view showing the procedure of processing in the inference unit 1003. The inference noise amount estimation unit 1004 acquires the input image data 1006, and estimates the noise amount of the input image data 1006 using the learned model 1022. To estimate the noise amount, the neural network is used. As shown in FIG. 11A, the inference noise amount estimation unit 1004 inputs the input image data 1006 to a first CNN 1101, repeats a convolution operation and a nonlinear operation by the filters given by equations (1) and (2) a plurality of times, and outputs a noise amount estimation result 1102 of the input image data.

The processing of the first CNN 1101 will be described next with reference to FIGS. 11A and 4A. The first CNN 1101 is formed by a plurality of filters 401 that perform the above-described operation given by equation (1). The inference noise amount estimation unit 1004 inputs the input image data 1006 to the CNN. Next, the inference noise amount estimation unit 1004 sequentially applies the filters 401 to the input image data 1006, thereby calculating a feature map. After that, the inference noise amount estimation unit 1004 outputs the result of applying the final filter 401 as the noise amount estimation result 1102 to the inference noise reduction unit 1005. The noise amount estimation result 1102 has the same channels as those of the input image data 1006.

The inference noise reduction unit 1005 receives the noise amount estimation result 1102, and performs restoration processing for deterioration of the input image data 1006 based on the estimation result. More specifically, the inference noise reduction unit 1005 inputs the input image data 1006 and the noise amount estimation result 1102 to a second CNN 1103. Then, the inference noise reduction unit 1005 repeats a convolution operation and a nonlinear operation by the filters given by equations (1) and (2) a plurality of times, and outputs output image data 1007 obtained after the restoration processing.

Figure 4B:
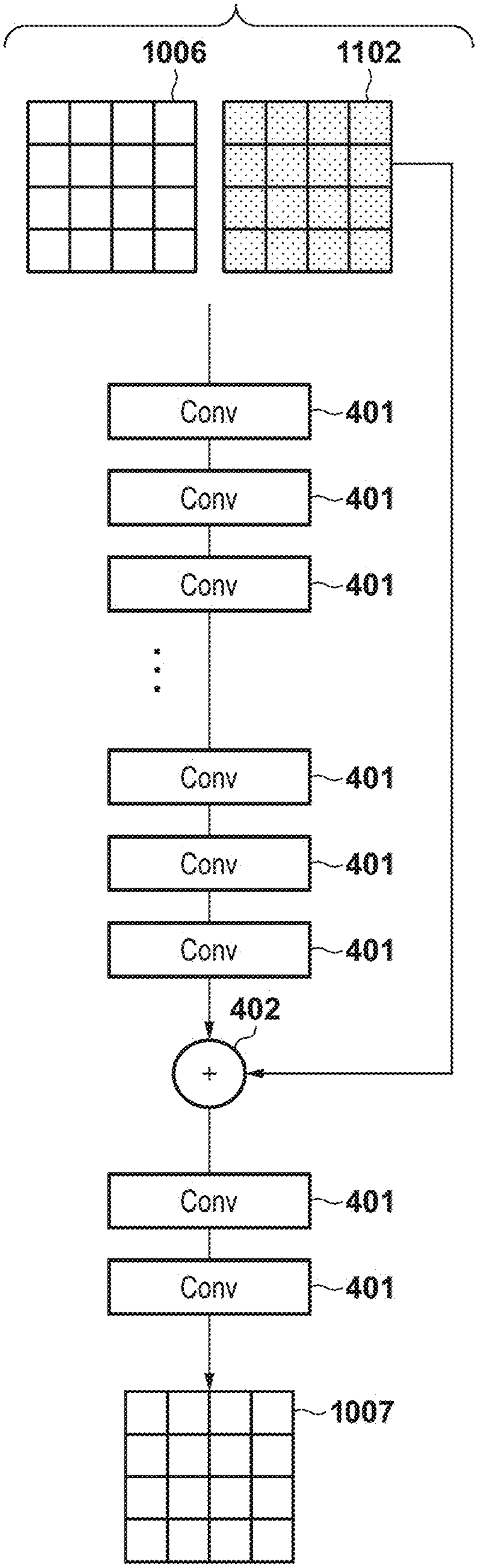
FIG. 4B is a view for explaining the structure of the second CNN and the procedure of learning and inference.

The processing of the second CNN 1103 will be described next with reference to FIGS. 11A and 4B. As shown in FIG. 4B, the second CNN 1103 is formed by the plurality of filters 401 and a concatenation layer 402. The inference noise reduction unit 1005 inputs, to the CNN, data obtained by adding or concatenating the input image data 1006 and the noise amount estimation result 1102 in the channel direction. Next, the inference noise reduction unit 1005 sequentially applies the filters 401 to the input data, thereby calculating a feature map. Subsequentially, the inference noise reduction unit 1005 concatenates the feature map and the input data in the channel direction by the concatenation layer 402. In addition, the inference noise reduction unit 1005 sequentially applies the filters 401 to the concatenation result, and outputs the output image data 1007 having the number of channels which is equal to that of the input image data 1006 from the final filter.

Subsequently, the function units of the cloud server 1010, and the like, will be described. The cloud server 1010 generates the learned model 1022 by learning a model for restoring an image, and transfers the learned model 1022 to the edge device 1000. As shown in FIG. 10, the cloud server 1010 includes a learning data generation unit 1011 and a learning unit 1012. The learning data generation unit 1011 includes a deterioration application unit 1013 and a learning signal interpolation unit 1014. The learning unit 1012 includes a learning noise amount estimation unit 1015, a learning noise reduction unit 1016, an error calculation unit 1017, and a model update unit 1018.

The deterioration application unit 1013 adds noise according to a binomial distribution to supervisory image data extracted from a supervisory image group without deterioration, thereby generating student image data. At least some signals of noise may be obtained by reproducing the local positive peak signal. In this embodiment, the deterioration application unit 1013 analyzes the physical characteristic of an image capturing apparatus based on the setting values of the image capturing apparatus, and the like, and adds, to supervisory image data, as a deterioration element, noise corresponding to a deterioration amount of a range wider than a deterioration amount that can occur in the image capturing apparatus, thereby generating student image data. The reason why a deterioration amount of a range wider than the analysis result is that the range of the deterioration amount changes depending on the individual difference of the image capturing apparatus and thus the robustness is improved with a margin.

Figure 12:
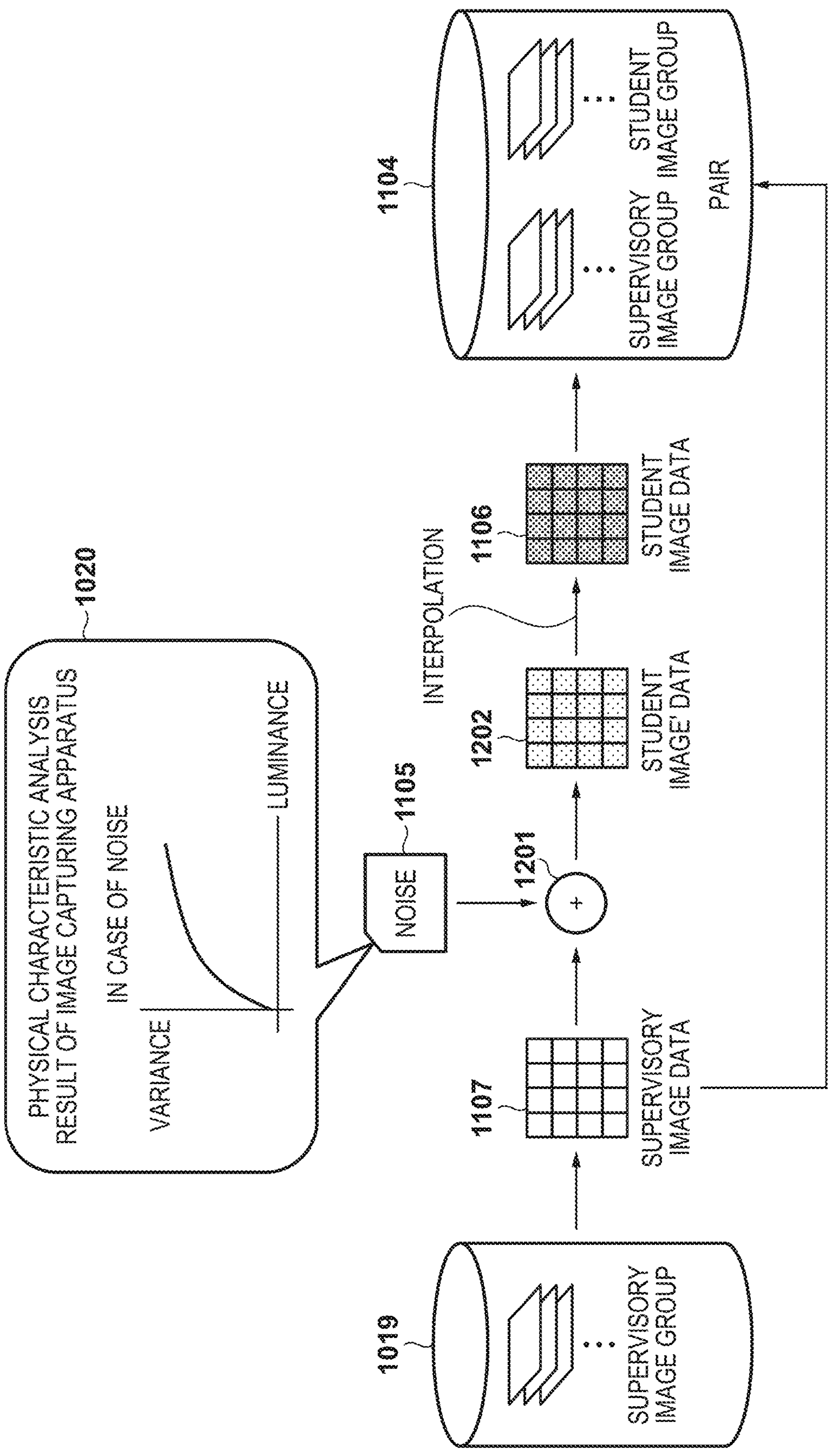
FIG. 12 is a view for explaining a deterioration application method.

FIG. 12 is a view for explaining a deterioration addition method. That is, as shown in FIG. 12, the deterioration application unit 1013 adds, to supervisory image data 1107 extracted from a supervisory image group 1019, as a deterioration element, noise 1105 based on a physical characteristic analysis result 1020 of the image capturing apparatus, thereby generating student image' data 1202. Note that part of the noise 1105 may be a signal obtained by reproducing the local positive peak signal. The physical characteristic analysis result 1020 of the image capturing apparatus may be, for example, data representing the relationship between the luminance and the variance of noise, as shown in FIG. 12. Then, the learning signal interpolation unit 1014 performs the same interpolation processing as that of the signal interpolation unit 112 for the student image' data 1202, thereby generating student image data 1106. Finally, the deterioration application unit 1013 and the learning signal interpolation unit 1014 use a pair of the supervisory image data 1107 and the student image data 1106 as learning data. The learning data generation unit 1011 adds a deterioration element to each supervisory image data of the supervisory image group 1019, and generates a student image group consisting of a plurality of student image data by executing interpolation processing, thereby generating learning data 1104.

The supervisory image group 1019 stores various kinds of image data such as nature photos including scenery or animals, photos of persons like portraits or sports photos, and photos of artifacts including architecture or merchandise. Furthermore, the physical characteristic analysis result 1020 of the image capturing apparatus includes a noise amount for each sensitivity, which is generated in an image sensor incorporated in the camera (image capturing apparatus). By using these noise amounts, the degree of image quality deterioration can be estimated for each image capturing condition. That is, the deterioration application unit 1013 can generate an image equivalent to an image obtained at the time of image capturing, by adding the deterioration estimated for a given image capturing condition to the supervisory image data.

The learning unit 1012 acquires network parameters 1021 to be applied to the CNN of deterioration restoration learning, initializes the weight of the CNN using the network parameters 1021, and then performs deterioration restoration learning using the learning data generated by the deterioration application unit 1013. The network parameters 1021 include the initial values of the parameters of the neural network, and hyperparameters indicating the structure of the neural network and an optimization method. The deterioration restoration learning in the learning unit 1012 is performed by the learning noise amount estimation unit 1015, the learning noise reduction unit 1016, the error calculation unit 1017, and the model update unit 1018.

Figure 11B:
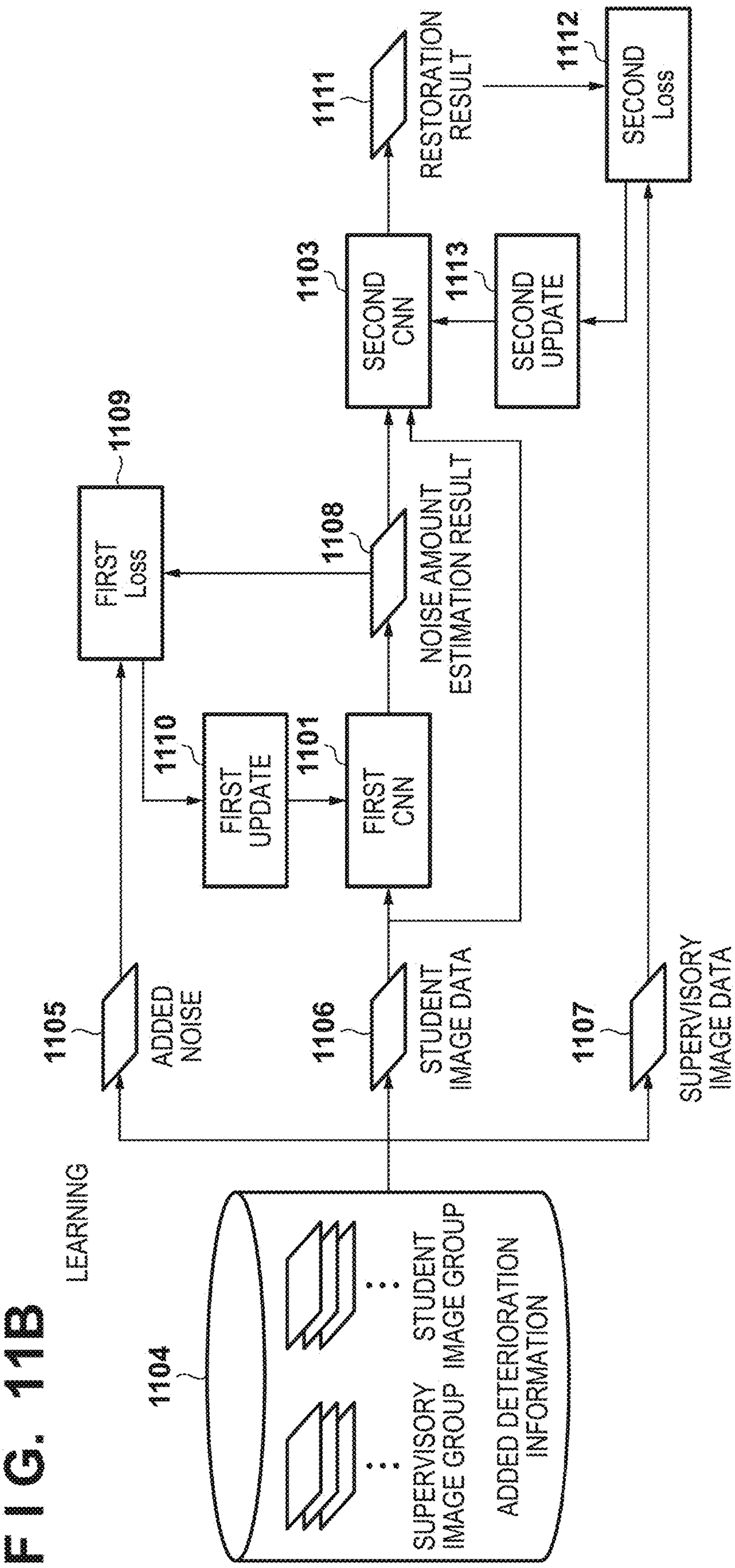
FIG. 11B is a view for explaining the procedure of learning according to the third embodiment.

FIG. 11B is a view showing the procedure of the processing in the learning unit 1012.

The learning noise amount estimation unit 1015 receives the learning data 1104 from the learning data generation unit 1011, and estimates a noise amount based on the noise 1105 added to the student image data 1106 included in the student image group of the learning data 1104. More specifically, the learning noise amount estimation unit 1015 inputs the student image data 1106 to the first CNN 1101, repeats a convolution operation and a nonlinear operation by the filters given by equations (1) and (2) a plurality of times, and outputs a noise amount estimation result 1108.

The learning noise reduction unit 1016 receives the student image data 1106 and the noise amount estimation result 1108 estimated by the learning noise amount estimation unit 1015, and performs noise reduction processing for the student image data 1106. More specifically, the learning noise reduction unit 1016 inputs the student image data 1106 and the noise amount estimation result 1108 to the second CNN 1103, repeats a convolution operation and a nonlinear operation by the filters given by equations (1) and (2) a plurality of times, and outputs a restoration result 1111.

The error calculation unit 1017 inputs the added noise 1105 and the noise amount estimation result 1108 to first Loss processing 1109 as a loss function operation, and calculates an error between them.

Next, the model update unit 1018 inputs the error calculated by the error calculation unit 1017 to first update processing 1110, and updates the network parameters associated with the first CNN 1101 so as to decrease (minimize) the error.

In addition, the error calculation unit 1017 inputs the supervisory image data 1107 and the noise amount estimation result 1108 to second Loss processing 1112, and calculates an error between them. Subsequently, the model update unit 1018 inputs the calculated error to second update processing 1113, and updates the network parameters associated with the second CNN 1103 so as to decrease the error.

In this example, the added noise 1105, the student image data 1106, and the noise amount estimation result 1108 have the same number of pixels.

Note that the learning noise amount estimation unit 1015 and the learning noise reduction unit 1016 calculate the errors at different timings but update the network parameters at the same timing. The first CNN and the second CNN used by the learning unit 1012 may be the same neural networks as the first CNN and the second CNN used by the inference unit 1003, respectively.

<Procedure of Processing of Entire System>

Figure 13A:
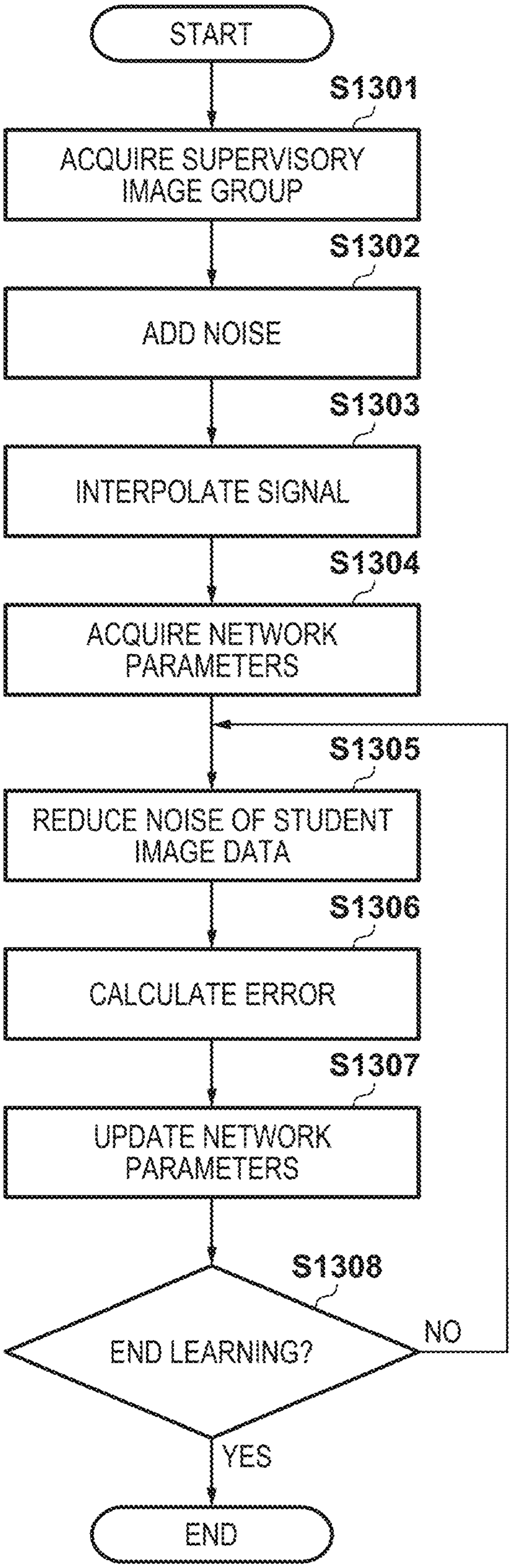
FIG. 13A is a flowchart illustrating the procedure of processing in a cloud server according to the third embodiment.
Figure 13B:
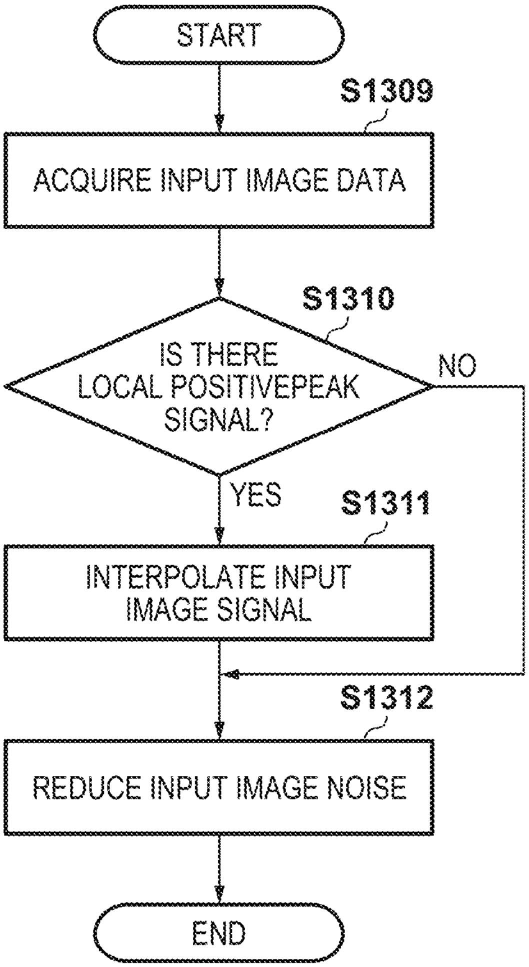
FIG. 13B is a flowchart illustrating the procedure of processing in an edge device according to the third embodiment.

Various kinds of processes performed in the information processing system according to the third embodiment will be described next with reference to FIGS. 13A and 13B. FIGS. 13A and 13B are flowcharts each illustrating the procedure of processing in the information processing system according to the third embodiment. FIG. 13A is a flowchart illustrating the procedure of processing performed in the cloud server 1010. FIG. 13B is a flowchart illustrating the procedure of processing performed in the edge device 1000. Each process shown in FIGS. 13A and 13B is executed by each function unit shown in FIG. 10 implemented when a CPU 101 or 201 executes a computer program.

The procedure of processing of learning a model, which is performed by the cloud server 1010, will be described with reference to the flowchart shown in FIG. 13A. Note that the cloud server 1010 stores, in advance, the supervisory image group 1019 prepared by the user or the like and the physical characteristic analysis result 1020 of the image capturing apparatus such as the characteristic of the image sensor and the sensitivity at the time of image capturing.

In step S1301, the deterioration application unit 1013 acquires the data of the supervisory image group 1019 and the physical characteristic analysis result 1020 of the image capturing apparatus, which are stored in the cloud server 1010.

In step S1302, the deterioration application unit 1013 adds noise based on the physical characteristic analysis result 1020 of the image capturing apparatus to the supervisory image data of the supervisory image group 1019 input in step S1301, and generates student image data. Note that the deterioration application unit 1013 may add noise of an amount measured in advance based on the physical characteristic analysis result 1020 of the image capturing apparatus in a preset order or random order.

In step S1303, the learning signal interpolation unit 1014 interpolates a signal in the student image data added with noise. The signal interpolation may be performed by the same interpolation processing as in step S603.

In step S1304, the learning noise amount estimation unit 1015 and the learning noise reduction unit 1016 acquire the network parameters 1021 to be applied to the CNN of deterioration restoration learning. As described above, the network parameters include the initial values of the parameters of the neural network, and hyperparameters indicating the structure of the neural network and an optimization method.

In step S1305, after initializing the weight of the CNN using the received network parameters 1021, the learning noise amount estimation unit 1015 estimates the noise amount of the student image data generated in step S1302. Then, the learning noise reduction unit 1016 performs noise reduction of the student image data based on the estimation result of the noise amount.

In step S1306, the error calculation unit 1017 calculates the error between the estimation result of the noise amount and the supervisory image data in accordance with the loss function given by equation (3).

In step S1307, the model update unit 1018 updates the network parameters so as to decrease (minimize) the error obtained in step S1306.

In step S1308, the learning unit 1012 determines whether to end learning. If the learning unit 1012 determines not to end learning, the processing of the cloud server 1010 returns to step S1305, and learning is performed using another student image data and supervisory data by the processes from step S1305. On the other hand, if the learning unit 1012 determines to end learning, this processing ends.

Subsequently, the procedure of processing performed in the edge device 1000 according to the third embodiment will be described with reference to the flowchart shown in FIG. 13B. Assume that the cloud server 1010 transmits, in advance, the learned model 1022 and the input image data 1006 to the edge device 1000.

In step S1309, the signal determination unit 1001 acquires the input image data 1006 and the learned model 1022 learned in the cloud server 1010.

In step S1310, the signal determination unit 1001 determines whether the input image data 1006 includes the sparse local positive peak signal. If the signal determination unit 1001 determines that the local positive peak signal is included, the process advances to step S1311. If the signal determination unit 1001 determines that no local positive peak signal is included, the process advances to step S1312.

In step S1311, the inference signal interpolation unit 1002 interpolates an interpolation signal to the peripheral pixels of the positive peak signal in the input image.

In step S1312, the inference noise amount estimation unit 1004 estimates the noise amount of the input image using the received learned model 1022. Then, the inference noise reduction unit 1005 reduces the noise of the input image based on the estimation result.

The procedure of the entire processing performed in the information processing system according to the third embodiment has been described above.

The third embodiment has explained a method of improving the accuracy of deterioration restoration by combining the inference-based preprocessing with the learning-based approach of performing learning using the interpolated image in which the positive peak signal is reproduced and spread in the space-time direction.

This embodiment is based on the premise of use of a neural network, and can perform more effective deterioration restoration than the first and second embodiments. Although it takes time because processing is performed at the time of creating learning data, this has no influence at the time of inference. Thus, it is possible to maintain the same processing speed as in a case when the neural network is used in each of the first and second embodiments.

Note that, in the third embodiment, the noise amount of student image data immediately after deterioration is added is estimated, but the noise amount of student image data in which a signal has been interpolated may be estimated.

The present invention can also be implemented by processing of supplying a program for implementing at least one function of the above-described embodiments to a system or an apparatus via a network or a storage medium and reading out and executing the program by at least one processor in the computer of the system or apparatus. The present invention can also be implemented by a circuit (for example, ASIC) for implementing at least one function.

The above-described embodiments are merely specific examples of implementing the present invention, and the interpretation of the technical scope of the present invention should not be limited to them. That is, the present invention can be implemented in various forms without departing from its technical spirit or its main features.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:

at least one processor operatively coupled to a memory, serving as:

a determination unit configured to acquire an image including a target pixel as a pixel of a local positive peak signal and captured by a photon-counting image sensor;

an interpolation unit configured to interpolate an interpolation signal to a peripheral pixel as a pixel around the target pixel of the image; and a reduction unit configured to reduce noise of the image in which the interpolation signal has been interpolated, wherein the local positive peak signal spreads over a plurality of pixels, and an image, in which a signal of the peripheral pixel is a signal of a black level not higher than a predetermined level threshold, is acquired.

2. The apparatus according to claim 1, wherein the determination unit determines the presence/absence of the target pixel.

3. The apparatus according to claim 1, wherein the determination unit determines the presence/absence of the target pixel based on a setting value of an image capturing apparatus that has captured the image.

4. The apparatus according to claim 1, wherein the determination unit determines the presence/absence of the target pixel based on at least one of a comparison between a predetermined pixel threshold and a pixel value difference as a difference between a pixel value of a pixel of interest as a determination target pixel and a pixel value of a pixel around the pixel of interest, and a comparison between a predetermined luminance threshold and a luminance difference as a difference between luminance of the pixel of interest and luminance of the pixel around the pixel of interest.

5. The apparatus according to claim 1, wherein the image acquired by the determination unit includes black floating.

6. The apparatus according to claim 1, wherein the image acquired by the determination unit is captured in a low-illuminance environment.

7. The apparatus according to claim 1, wherein the interpolation unit interpolates the interpolation signal to the peripheral pixel based on a positive peak signal included in a predetermined setting region around the target pixel.

8. The apparatus according to claim 7, wherein the interpolation unit interpolates the interpolation signal to the peripheral pixel existing in at least one of a spatial direction, a time direction, and a space-time direction.

9. The apparatus according to claim 8, wherein the interpolation unit interpolates the interpolation signal based on a weighted average of signals within the setting region around the target pixel.

10. The apparatus according to claim 1, wherein the interpolation unit generates the interpolation signal by duplicating a signal of the target pixel to a pixel in a predetermined setting region around the target pixel.

11. The apparatus according to claim 10, wherein the interpolation unit determines a strength of the interpolation signal based on a distance between the target pixel and the peripheral pixel.

12. The apparatus according to claim 1, wherein the reduction unit preserves the positive peak signal as a ratio of the positive peak signal in a predetermined region is higher.

13. The apparatus according to claim 12, wherein, in a case when images of a plurality of frames are used, the reduction unit determines, based on an occurrence frequency of the positive peak signal at same pixel positions in the images of each frame, whether to preserve the positive peak signal.

14. The apparatus according to claim 1, wherein the reduction unit uses a neural network that has performed learning using learning data based on an image added with noise which reproduces the positive peak signal.

15. The apparatus according to claim 14, wherein the learning data is obtained by adding noise according to a binomial distribution to an image before noise is added, and then interpolating the interpolation signal around the noise.

16. The apparatus according to claim 1, wherein, in a case when a signal of a pixel spatially located around a pixel of interest as a determination target pixel is at a predetermined black level, the determination unit determines the pixel of interest as the target pixel.

17. The apparatus according to claim 1, wherein the determination unit acquires a plurality of images that are chronologically continuous to each other, and, in a case when a signal of a pixel that is located at the same pixel position as a pixel of interest as a determination target pixel and is temporally adjacent to the pixel of interest is at a predetermined black level, the determination unit determines the pixel of interest as the target pixel.

18. An information processing method comprising:

acquiring an image including a target pixel as a pixel of a local positive peak signal and captured by a photon-counting image sensor;

interpolating an interpolation signal to a peripheral pixel as a pixel around the target pixel of the image; and reducing noise of the image in which the interpolation signal has been interpolated, wherein the local positive peak signal spreads over a plurality of pixels, and an image, in which a signal of the peripheral pixel is a signal of a black level not higher than a predetermined level threshold, is acquired.

19. A non-transitory computer-readable storage medium storing a computer program for causing, when loaded and executed by a computer, the computer:

to acquire an image including a target pixel as a pixel of a local positive peak signal and captured by a photon-counting image sensor;

to interpolate an interpolation signal to a peripheral pixel as a pixel around the target pixel of the image; and to reduce noise of the image in which the interpolation signal has been interpolated, wherein the local positive peak signal spreads over a plurality of pixels, and an image, in which a signal of the peripheral pixel is a signal of a black level not higher than a predetermined level threshold, is acquired.

* * * * *